United States Patent
Smith et al.

(10) Patent No.: US 10,966,075 B2
(45) Date of Patent: Mar. 30, 2021

(54) VIRTUAL BEACONS

(71) Applicant: Telefonaktiebolaget LM Ericsson (publ), Stockholm (SE)

(72) Inventors: Roland Smith, Nepean (CA); Pontus Arvidson, Sollentuna (SE); Leif Wilhelmsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/606,560

(22) PCT Filed: Apr. 18, 2017

(86) PCT No.: PCT/IB2017/052217
§ 371 (c)(1),
(2) Date: Oct. 18, 2019

(87) PCT Pub. No.: WO2018/193286
PCT Pub. Date: Oct. 25, 2018

(65) Prior Publication Data
US 2020/0059770 A1 Feb. 20, 2020

(51) Int. Cl.
*H04B 7/00* (2006.01)
*H04W 4/80* (2018.01)
(Continued)

(52) U.S. Cl.
CPC .............. *H04W 4/80* (2018.02); *G01S 5/02* (2013.01); *H04B 17/10* (2015.01); *H04W 4/021* (2013.01);
(Continued)

(58) Field of Classification Search
CPC ......... H04W 4/80; H04W 4/33; H04W 4/029; H04W 4/021; H04W 4/023; H04W 4/06; H04W 8/005; H04B 17/10; G01S 5/02
See application file for complete search history.

(56) References Cited

U.S. PATENT DOCUMENTS 9,363,784 B1 * 6/2016 Friday .................. H04W 4/029
9,565,531 B2 * 2/2017 Jack ........................ H04W 4/18
(Continued)

OTHER PUBLICATIONS

Author Unknown, "Bluetooth Core Specification: Version 5.0," vols. 0-7, Bluetooth SIG Proprietary, Dec. 6, 2016, 2822 pages.
(Continued)

*Primary Examiner* — Kathy W Wang-Hurst
*Assistant Examiner* — Max Mathew
(74) *Attorney, Agent, or Firm* — Withrow & Terranova, PLLC

(57) ABSTRACT

Methods and systems for providing virtual beacons are presented. According to one aspect, a method for providing a virtual beacon at a first location comprises transmitting, by a transmitter at a second location geographically different from the first location, an information signal using a transmit power level, Pj, and including an advertised transmit power level, PA, both selected to be indicative of a distance, d, between a location of a receiver of the information signal and the first location. The signal transmitted from the second location emulates a signal that would have been produced by a beacon located at the first location. The information signals may be aimed at one or more User Equipments (UEs), and/or may be focused on one or more specific target locations rather than on individual UEs.

30 Claims, 15 Drawing Sheets

(51) Int. Cl.
*H04B 17/10* (2015.01)
*H04W 4/33* (2018.01)
*H04W 4/029* (2018.01)
*G01S 5/02* (2010.01)
*H04W 4/021* (2018.01)
*H04W 4/02* (2018.01)
*H04W 4/06* (2009.01)
*H04W 8/00* (2009.01)

(52) U.S. Cl.
CPC ........... *H04W 4/023* (2013.01); *H04W 4/029* (2018.02); *H04W 4/06* (2013.01); *H04W 4/33* (2018.02); *H04W 8/005* (2013.01)

(56) References Cited

U.S. PATENT DOCUMENTS

| | | | | |
|---|---|---|---|---|
| 9,622,024 | B1* | 4/2017 | Shanmugam | H04L 41/0806 |
| 10,373,189 | B2* | 8/2019 | Walden | H04W 4/80 |
| 2009/0022078 | A1* | 1/2009 | Patterson | G01D 21/00 370/311 |
| 2012/0087430 | A1* | 4/2012 | Forenza | H04B 7/0452 375/267 |
| 2016/0007181 | A1 | 1/2016 | Palin et al. | |
| 2016/0323754 | A1* | 11/2016 | Friday | H04W 16/28 |
| 2017/0273008 | A1* | 9/2017 | Friday | H04W 16/28 |
| 2018/0004212 | A1* | 1/2018 | Tang | G05D 1/02 |
| 2019/0327616 | A1* | 10/2019 | Ganu | H04W 12/08 |
| 2020/0059770 | A1* | 2/2020 | Smith | H04W 4/06 |

OTHER PUBLICATIONS

Author Unknown, "Supplement to the Bluetooth Core Specification: Specification of the Bluetooth System CSS Version 7," Bluetooth SIG Proprietary, Dec. 6, 2016, 37 pages.

Author Unknown, "Series X: Data Networks and Open System Communications: OSI networking and system aspects—Naming, Addressing and Registration: Information technology—Open Systems Interconnection—Procedures for the operation of OSI Registration Authorities: Generation and registration of Universally Unique Identifiers (UUIDs) and their use as ASN.1 object identifier components," Telecommunication Standardization Sector of ITU (ITU-T), Recommendation ITU-T X.667, Sep. 2004, International Telecommunication Union, 34 pages.

Author Unknown, "5G—Massive MIMO—Why Massive MIMO?" ShareTechnote.com, published Mar. 2015, http://www.sharetechnote.com/html/5G/5G_MassiveMIMO_Motivation.html, retrieved Oct. 16, 2019, 8 pages.

Koudas, Nick, "The Hitchhikers Guide to iBeacon Hardware: A Comprehensive Report by Aislelabs (2015)" Aislelabs, published May 4, 2015, https://www.aislelabs.com/reports/beacon-guide/, retrieved Oct. 16, 2019, 19 pages.

Leach Paul, J. et al., "A Universally Unique Identifier (UUID) URN Namespace," The Internet Engineering Task Force (IETF), Network Working Group, Request for Comments: 4122, Category: Standards Track, Jul. 2005, 32 pages.

International Search Report and Written Opinion for International Patent Application No. PCT/IB2017/052217, dated Sep. 29, 2017, 16 pages.

Written Opinion for International Patent Application No. PCT/IB2017/052217, dated Mar. 18, 2019, 12 pages.

International Preliminary Report on Patentability for International Patent Application No. PCT/IB2017/052217, dated Jul. 8, 2019, 38 pages.

Author Unknown, "Information technology—Open Systems Interconnection—Remote Procedure Call (RPC)," ISO/IEC 11578, First Edition, Dec. 15, 1996, 20 pages (preview only).

* cited by examiner

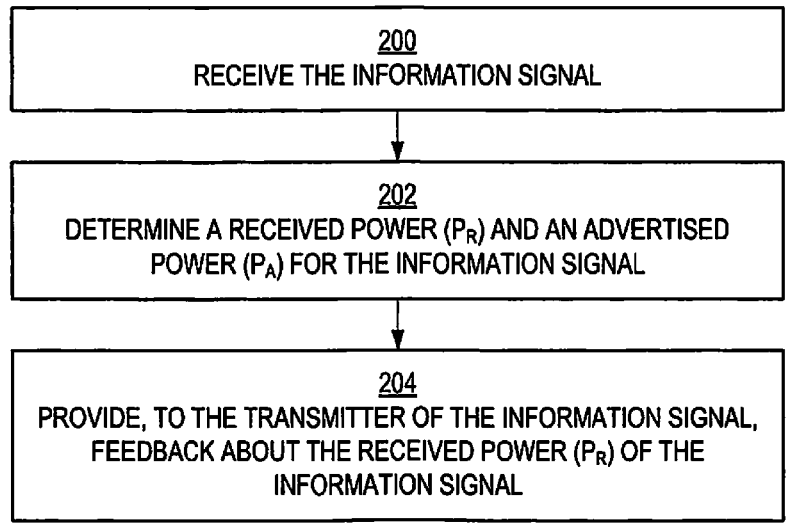

VIRTUAL BEACONS

This application is a 35 U.S.C. § 371 national phase filing of International Application No. PCT/IB2017/052217, filed Apr. 18, 2017, the disclosure of which is incorporated herein by reference in its entirety.

TECHNICAL FIELD

The present disclosure relates to broadcast-only wireless communications devices ("beacons") and more particularly to the use of multi-antenna technology to create "virtual" beacons.

BACKGROUND

The Internet of Things (IoT) industry has made significant strides with the introduction of a class of broadcast-only wireless communications devices, referred to herein as "beacons" and which are sometimes referred to as "nearable" technologies, such as the "iBeacon" protocol developed by Apple, Inc. Beacons are broadcasting-only devices: they cannot receive data. Therefore, their purpose is to allow for proximity detection, and to broadcast location specific information. For example, a beacon may be used to advertise data, to enable smart phones, or to trigger User Equipment (UE) or other mobile computing devices that approach or come into the vicinity of the beacon to perform specific actions.

Conventional Beacons

Many conventional beacons are Bluetooth Low Energy (BLE) beacons, which transmit frames such as the BLE frame 10 described below.

FIG. 1 illustrates the structure of a conventional BlueTooth Low Energy (BLE) beacon frame 10, which is defined in "Bluetooth Core Specification" [1]. The Bluetooth protocol is well defined, with fields such as:

The preamble field 12 used for synchronizations and always set to 'AA' for broadcast packets.

The access address field 14, also fixed for broadcast packets, is set to 0x8E89BED6.

The packet payload 16 contains a header 18 and payload data 20.

The Cyclic Redundancy Check (CRC) 22 ensures data integrity of the transmitted packets.

The header 18 includes data indicating the type of packet, among other information. The purpose of the packet is specified in the Protocol Data Unit (PDU) type field 24. Beacon transmissions may be "connectable" or "non-connectable," and the preferred embodiment is for non-connectable beacons with the PDU Type field 24 set to '0010' representing 'AVD_NONCONN_IND' or non-connectable undirected advertising packets. Some fields marked as Reserved for Future Use (RFU) 26. Other fields are important for Bluetooth beacons:

The Transmit Add (TxAdd) bit 28 indicates whether the advertiser's address (contained in the payload) is public (TxAdd=0) or random (TxAdd=1).

The Receive Add (RxAdd) field 30 is reserved for other types of packets.

The length field 32 contains the packet length.

The payload data field 20 includes the Advertiser's Address (AdvA) field 34, which is the advertiser's broadcast address 36, and the Advertiser's Data (AdvData) field 38, which contains up to 31 bytes of broadcast data 40. The broadcast data 40 typically contains many data elements, also referred to as Information Elements (IEs), defined in the "Supplement to the Bluetooth Core Specification" [2]. One such IE contains the "Tx Power Level" data type, which indicates the transmitted power level of the packet containing the data type. The Tx Power Level is defined as the radiated power level, and is used by receiver devices to calculate Path Loss (PL) for a received packet using the following equation:

$$\text{Path loss} = Tx\text{Power Level} - RSSI \qquad \text{Eq. 1}$$

where Received Signal Strength Indicator (RSSI) is the received signal strength, in Decibel-Milliwatts (dBm), of the received packet.

As an example, if Tx Power Level=+0 dBm and the RSSI on the received packet is −60 dBm, then the total PL is +0−(−60)=+60 dB. To relate the PL to the distance, a PL model is needed. PL may be calculated as a function of distance (d) using the following equation:

$$PL = \alpha \log_{10}\left(\frac{4\pi d}{\lambda}\right) \qquad \text{Eq. 2}$$

where $\alpha$ is the line of sight free space PL model coefficient, which assumes that signal strength drops in proportion to $1/(\text{distance})^2$, and is used by the Bluetooth™ consortium to estimate near-in PLs. Applying this equation to the example scenario above, the UE can determine that a PL of 60 dB corresponds to a distance of 10 meters. Consequently, the receiver would assume that the source transmitter of this beacon packet is 10 meters away.

Typically, $\alpha=20$. Clutter is not often seen in the first meter, so the equation above is suitable for distances less than a couple of meters. To accurately model PL over longer distances, however, the equation below includes an additional term to represent additional losses that occur at distances beyond 1 meter due to clutter, where $\beta$ is another PL coefficient:

$$PL = \alpha \log_{10}\left(\frac{4\pi d}{\lambda}\right) + \beta \log_{10}(d) \qquad \text{Eq. 3}$$

Where d is greater than 1 meter, the equation above can be simplified to:

$$PL = \alpha \log_{10}\left(\frac{4\pi}{\lambda}\right) + \beta \log_{10}(d) \qquad \text{Eq. 4}$$

For a 2.4 GHz signal and setting both $\alpha$ and $\beta$ to 20, the above equation becomes:

$$PL = 40 + 20 \log_{10}(d) \qquad \text{Eq. 5}$$

For 2.4 GHz radio transmitter, the first meter loss=40 dB; for a 5 GHz transmitter, the first meter loss=47 dB; for a 24 GHz transmitter, the first meter loss=67 dB.

Environmental clutter, such as trees and buildings outdoors, or shelves, walls, and people indoors, will change the equation. In clutter situations, the losses may be calculated using this equation, instead:

$$PL = 40 + 35 \log_{10}(d) \qquad \text{Eq. 6}$$

Other equations may be used by the UE depending on information received (or assumptions made) about the environmental clutter.

PL calculations are estimates only, and are affected by many issues such as fading, chip calibration, antenna patterns, etc. There are often uncertainties in the calculations; however, UE devices often employ averaging algorithms to help reduce these errors, and line of sight improves as the device approaches the transmitter, where obstacles are fewer. In the simple expression for PL given in Eq. 5 above, free space was assumed independent of the distance. A more accurate model would use a channel model that depends on the distance such that the more attenuation than free space is assumed when the distance is larger than some threshold value, as in the case of Eq. 6 above.

All of these calculations depend heavily on knowledge of the Tx Power Level, which is used to estimate the PL; this is a parameter used by the UE to locate the transmitter. This parameter is therefore configured in each beacon transmitter to be as accurate as possible, so as to enable the UE device to locate the transmitter.

A real world measured example below shows iPhone6 and iPad3 RSSI levels from beacons. The iPhone6 example shows immediate beacon at −63 dBm, representing 0.18 m or 18 cm. Assuming $1/r^2$ loss in the first meter near field, and a first meter loss of 40 dB, then 0.18 m has a loss of 25 dB. This implies a beacon power of −38 dBm (i.e. Tx Power Level=−38 dBm).

$$-38\ dBm - 25\ dBm = -63\ dBm$$

Using Tx Power Level=−38 dBm, then at 2.13 m, the PL would be: $40+20*\log_{10}(2.13)=47$ dB, so that the RSSI=−38−47 dB=−85 dBm. This closely aligns with the measured RSSI values shown in the tables below (−86 dBm, −89 dBm, etc.).

| iPhone 6 | | | |
|---|---|---|---|
| Beacon | Proximity | RSSI (dBm) | d (meters) |
| 1 | immediate | −63 | 0.18 |
| 2 | near | −89 | 2.13 |
| 3 | near | −86 | 2.18 |
| 4 | near | −89 | 2.36 |
| 5 | far | −86 | 2.40 |
| 6 | far | −89 | 2.55 |

| iPad3 | | | |
|---|---|---|---|
| Beacon | Proximity | RSSI (dBm) | d (meters) |
| 1 | near | −84 | 3.15 |
| 4 | far | −89 | 3.52 |
| 3 | far | −89 | 4.49 |
| 7 | far | −91 | 5.71 |
| 5 | far | −91 | 6.84 |
| 6 | far | −94 | 8.26 |

The data above shows that virtual beacons may use low power levels of −60 dBm to −95 dBm to indicate distances of 18 cm to 10 m.

FIG. 2 illustrates the frequency locations of the forty Radio Frequency (RF) channels defined by BLE, operating in the 2400 MHz-2483.5 Megahertz (MHz) Industrial Scientific Medical (ISM) globally unlicensed band. BLE define 40 RF channels, each of which having a bandwidth of 1-2 MHz. As can be seen in FIG. 2, BLE frequencies range from 2402 MHz to 2480 MHz, 2 MHz apart. The center frequency $f_k$ of each channel k is: $f_k=2402+k$ MHz, where k=0, 2, ..., 78.

FIG. 3 illustrates the frequency locations of thirty-seven data channels and three advertising channels within the forty channels defined by BLE. The frequency allocations for the data channels are indicated with solid lines and the frequency allocations for the advertising channels are indicated with dashed lines. The data channels are numbered from 0 to 36 and the advertising channels are numbered 37, 38, and 39. The advertising channels are used for beacons, and are narrow band channels.

FIG. 4 illustrates the frequency locations of commonly used Wi-Fi channels relative to some of the data and advertising channels defined by BLE. The frequency allocations for the BLE data channels are indicated with solid lines, the frequency allocations for the BLE advertising channels are indicated with simple dashed lines, and the frequency allocations for the WiFi channels 1, 6, and 11 are shown with lines having a "dash-dot" pattern. It can be seen from FIG. 4 that the frequency allocations for the advertising channels 37-39 were deliberately chosen to coexist with commonly used Wi-Fi channels.

FIG. 5 illustrates a typical conventional beacon deployment. In FIG. 5, a Bluetooth beacon 42 is transmitting signals that are detectable by a wireless device, such as UE 44A, 44B, and 44C, which may be collectively referred to as "UEs 44" or individually referred to as "a UE 44." A UE may also be referred to as a wireless device, a mobile terminal, a mobile station, and similar. Example UEs include, but are not limited to, mobile phones, cellphones, computers, tablets, and other devices that can communicate via a wireless communications protocol.

For a UE, such as the UE 44A, that is very close to the beacon 42, e.g., within a first distance D1 from the beacon 42, the beacon 42 is said to be an "immediate" beacon or immediate to the UE 44A. For a UE, such as the UE 44B, that is more than the first distance D1 away from the beacon 42 but less than a second distance D2 from the beacon 42, the beacon 42 is said to be a "near" beacon. For a UE, such as the UE 44C, that is more than D2 away from the beacon 42, the beacon 42 is said to be a "far" beacon. For the sake of description, the following convention will be used: the strength of a signal detected by a UE from an immediate beacon will be said to be high (H), the strength of a signal detected by a UE from a near beacon will be said to be medium (M), and the strength of a signal detected by a UE from a far beacon will be said to be low (L). In the example illustrated in FIG. 5, each UE 44 displays the strength of signal detected from the beacon 42: the UE 44A receives a high-strength signal, the UE 44B receives a medium-strength signal, and the UE 44C receives a low-strength signal.

FIG. 6 is a graph illustrating the measured signal strength of a beacon 42 (Y-axis) versus distance from the beacon location (X-axis). (In this example, the beacon 42 is attached to or is very close to an article of clothing, such as a shirt.) The strength of the signal (e.g., reported by the UE as a RSSI) is highest at the beacon 42 and drops in strength with increasing distance from the beacon 42. A UE determines the RSSI of the physical beacon, and combined with the Tx Power Level value contained within the beacon transmission, calculates a distance. According to some standards that distance may be characterized as "immediate," "near," or "far."

Beacons can be used as indoor positioning systems, which enable mobile commerce, such as location directed advertising when the UE is in range of a specific store or even a vending machine. Beacons may also be used at Points of Interest (POI), e.g., to broadcast the identity of the POI, the geographic location of the POI, other information about the POI, and so on.

Beacons typically use BLE transmitters to broadcast identity information, which may include a 16 byte Universally Unique Identifier (UUID) typically used to identify a company. Additional "Major" and "Minor" 2-byte integers are often included to advertise specific beacons. This information is then received and demodulated by nearby mobile devices, which may allow location aware Operating System (OS) or applications to trigger specific actions, such as provide push notifications to the UE.

The ecosystem for beacons has become significant, with many manufacturers, each offering unique form factors, product colors, and varying battery life. Store owners who purchase beacons may easily install them throughout their stores. Beacons do not have a requirement for network connectivity, which minimizes power consumption, simplifies beacon installations, and keeps costs low. Since beacons are broadcast only, they cannot track users, because the beacons have no knowledge of the devices around them.

However, beacons have disadvantages as well. A store owner, for example, who deploys beacons throughout a store, must then manage these devices, including ensuring that the beacons have not been removed and are still operational. A significant issue with today's beacons is their maintenance, and a key concern with maintenance is battery life, which ranges typically between 6-24 months using standard batteries and long beacon intervals. If a battery-operated beacon loses power and stops transmitting, for example, unless the beacon is still in the same location where it was deployed the beacon may be very difficult to locate for battery replacement or repair. Other maintenance issues include configuration, damage, and theft. Due to their low cost, and design, most beacons are not network connected, and as a result are typically not software-upgradable (or at least cannot be upgraded remotely, via a wireless network), and are thus shipped with a fixed software capability. In short, beacons are intended to be employed, and as newer technology evolves, discarded, and replaced. Beacon devices must be ordered, programmed, and then managed as any other asset in the store. Due to beacons' small size and accessibility to the general population, measures must also be taken to avoid their damage, or theft.

SUMMARY

The present disclosure addresses the disadvantages of conventional beacons described above by replacing the physical beacon, which radiates a signal from where it is located, e.g., location X, with a beacon that is generated from a different physical location, e.g., location Y, but that creates a signal at location X that is similar to the signal that would have been produced by a conventional beacon at location X (herein referred to as a "virtual beacon"). In one embodiment, multi-antenna technology is used at the different physical location Y to send a signal such that devices that detect the signal will experience signal properties resembling those that would be produced by a beacon actually located at location X. Examples of multi-antenna technologies that may be used for this purpose include, but are not limited to, cellular telecommunications networks. In one embodiment, Long Term Evolution (LTE) systems can use Multiple Input Multiple Output (MIMO) antenna arrays for this purpose. Likewise, Massive MIMO (M-MIMO) and Multiple User MIMO (MU-MIMO) may be used.

According to an aspect of the present disclosure, a method for providing a virtual beacon at a first location comprises transmitting, by a transmitter at a second location geographically different from the first location, an information signal using a transmit power level, $P_T$, and including an advertised transmit power level, $P_A$, both selected to be indicative of a distance, d, between a location of a receiver of the information signal and the first location.

In one embodiment, the $P_T$ and the $P_A$ are selected such that, at a receiver of the information signal, a difference between $P_A$ and a received power level, $P_R$, of the information signal will be indicative of the distance, d, between the location of the receiver of the information signal and the first location.

In one embodiment, transmitting the information signal comprises: determining the distance, d, between the location of the receiver of the information signal and the first location; determining a received power level, $P_R$, and $P_A$ of the information signal that is indicative of the distance, d, between the location of the receiver of the information signal and the first location; determining the transmit power level, $P_T$, required to achieve the determined received power level, $P_R$; and transmitting, to the location of the receiver of the information signal, the information signal having the determined transmit power level, $P_T$.

In one embodiment, determining the transmit power level, $P_T$, comprises determining $P_T$ according to the equation: $P_T$=pathloss($D_R$)−pathloss(d)+$P_A$, where $D_R$ is a distance from the transmitter to the receiver of the information signal.

In one embodiment, determining the transmit power level, $P_T$, comprises determining $P_T$ according to the equation:

$$P_T = 20\log_{10}\left(\frac{D_R}{d}\right) + P_A,$$

where $D_R$ and d are in meters.

In one embodiment, the received power level, $P_R$, emulates a received power level, $P_R$, of a signal that would have been produced by a beacon located at the first location.

In one embodiment, the transmitter transmits a plurality of information signals, one to each of a plurality of receivers of the corresponding information signal, each information signal having its own received power level, $P_R$, at the corresponding receiver.

In one embodiment, a received power level, $P_R$, of one of the transmitted information signals is different from a received power level, $P_R$, of another of the transmitted information signals.

In one embodiment, one of the transmitted information signals is of a different signal type, signal frequency, or signal protocol than another of the transmitted information signals.

In one embodiment, the method further comprises maintaining the select advertised transmit power level, $P_A$, at a constant value and adjusting the select transmit power level, $P_T$, as the distance, d, between the location of the receiver of the information signal and the first location changes.

In one embodiment, the method further comprises maintaining the select transmit power level, $P_T$, at a constant level and adjusting the select advertised transmit power level, $P_A$, as the distance, d, between the location of the receiver of the information signal and the first location changes.

In one embodiment, the method further comprises adjusting both the select transmit power level $P_T$ and the select advertised transmit power level, $P_A$, as the distance, d, between the location of the receiver of the information signal and the first location changes.

In one embodiment, transmitting the information signal comprises: determining the distance, $D_L$, between the location of the transmitter of the information signal and the first location; determining a received power level, $P_R$, and $P_A$ of the information signal that is indicative of the distance, d, between the location of the receiver of the information signal and the first location; determining the transmit power level, $P_T$, required to achieve the determined received power level, $P_R$; and transmitting, to the location of the receiver of the information signal, the information signal having the determined transmit power level, $P_T$.

In one embodiment, determining the transmit power level, $P_T$, comprises determining $P_T$ according to the equation: $P_T$=pathloss($D_L$)+$P_A$ In one embodiment, determining the transmit power level, $P_T$, comprises determining $P_T$ according to the equation: $P_T$=20 $\log_{10}(D_L)$+$P_A$ where $D_L$ is in meters.

In one embodiment, transmitting the information signal comprises: configuring a plurality of antennas to generate a plurality of signals having amplitude and phase relationships such that a coherent Radio Frequency (RF) field is produced at the first location; and transmitting the plurality of signals using the plurality of antennas such that the coherent RF field is produced at the first location, the coherent RF field carrying the information signal and having a desired power profile relative to the first location.

In one embodiment, the coherent RF field has maximum coherence at the first location and wherein the coherence diminishes with increasing distance from the first location.

In one embodiment, the method further comprises transmitting the plurality of signals using the plurality of antennas to produce a plurality of coherent RF fields, each coherent RF field carrying its own information signal.

In one embodiment, a location of one of the plurality of coherent RF fields is different from a location of another of the plurality of coherent RF fields.

In one embodiment, an information signal carried by one of the plurality of coherent RF fields is different from an information signal carried by another of the plurality of coherent RF fields.

In one embodiment, the method further comprises receiving channel feedback information from the receiver of the information signal and using the received channel feedback information to adjust a transmit power level, $P_T$, of the information signal.

In one embodiment, the channel feedback information comprises sounding reference signals.

In one embodiment, the channel feedback information comprises OFDM pilot-tones used for channel estimation.

In one embodiment, the channel feedback information comprises channel state information such as sent in 802.11 NDP channel sounding.

In one embodiment, the channel feedback may be a direct estimate of the MIMO channel from training symbols sent to the client device.

In one embodiment, the information signal comprises at least one from the group of: a Bluetooth or Bluetooth Low Energy (BLE) beacon; an Institute of Electrical and Electronic Engineers (IEEE) 802.15 beacon; and an IEEE 802.11 beacon.

In one embodiment, the information signal is transmitted using a MIMO protocol.

In one embodiment, MIMO beamforming is used to change the amplitude of the transmitted information signal.

In one embodiment, MIMO zero forcing is used to minimize the information signal received by radio receivers other than the receiver of the information signal.

In one embodiment, the information signal is transmitted using distributed MIMO.

In one embodiment, the method further comprises generating a plurality of information signals by a plurality of transmitters.

In one embodiment, the information signal is transmitted using MU-MIMO.

In one embodiment, the transmitting step is performed by a plurality of transmitters at locations geographically different from the first location.

In one embodiment, the transmitter comprises a LTE transmitter, a Fifth Generation (5G) transmitter, a New Radio (NR) transmitter, or a transmitter that supports Advanced Antenna Systems (AAS).

According to another aspect of the present disclosure, a radio transceiver comprises: a radio transmitter; one or more processors; and memory storing instructions executable by the one or more processors, whereby the radio transceiver is operable to: transmit an information signal using a transmit power level, $P_T$, and including an advertised transmit power level, $P_A$, both selected to be indicative of a distance, d, between a location of the receiver of the information signal and a first location, the first location being geographically different from the location of the radio transmitter.

In one embodiment, $P_T$ and $P_A$ are selected such that, at a receiver of the information signal, a difference between $P_A$ and a received power level, $P_R$, of the information signal will be indicative of the distance, d, between the location of the receiver of the information signal and the first location.

In one embodiment, the target location is a location of the receiver of the information signal and wherein transmitting the information signal comprises: determining the distance, d, between the location of the receiver of the information signal and the first location; determining the received power level, $P_R$, and $P_A$ of the information signal that is indicative of the distance, d, between the location of the receiver of the information signal and the first location; determining the transmit power level, $P_T$, required to achieve the determined received power level, $P_R$; and transmitting, to the location of the receiver of the information signal, the information signal having the determined transmit power level, $P_T$.

In one embodiment, determining the transmit power level, $P_T$, comprises determining $P_T$ according to the equation: $P_T$=pathloss($D_R$)−pathloss(d)+$P_A$, where $D_R$ is a distance from the transmitter to the receiver of the information signal.

In one embodiment, determining the transmit power level, $P_T$, comprises determining $P_T$ according to the equation:

$$P_T = 20\log_{10}\left(\frac{D_R}{d}\right) + P_A,$$

where $D_R$ and d are in meters.

In one embodiment, the received power level, $P_R$, emulates a received power level, $P_R$, of a signal that would have been produced by a beacon located at the first location.

In one embodiment, the radio transceiver transmits a plurality of information signals, one to each of a plurality of receivers of the corresponding information signal, each information signal having its own received power level, $P_R$, at the corresponding receiver.

In one embodiment, a received power level, $P_R$, of one of the transmitted information signals is different from a received power level, $P_R$, of another of the transmitted information signals.

In one embodiment, one of the transmitted information signals is of a different signal type, signal frequency, or signal protocol than another of the transmitted information signals.

In one embodiment, the radio transceiver is further operable to maintain the select advertised transmit power level, $P_A$, at a constant value and adjust the select transmit power level, $P_T$, as the distance, d, between the location of the receiver of the information signal and the first location changes.

In one embodiment, the radio transceiver is further operable to maintain the select transmit power level, $P_T$, at a constant level and adjust the select advertised transmit power level, $P_A$, as the distance, d, between the location of the receiver of the information signal and the first location changes.

In one embodiment, the radio transceiver is further operable to adjust both the select transmit power level, $P_T$, and the select advertised transmit power level, $P_A$, as the distance, d, between the location of the receiver of the information signal and the first location changes.

In one embodiment, transmitting the information signal comprises: configuring a plurality of antennas to generate a plurality of signals having amplitude and phase relationships such that a coherent RF field is produced at the first location; and transmitting the plurality of signals using the plurality of antennas such that the coherent RF field is produced at the first location, the coherent RF field carrying the information signal and having a desired power profile relative to the first location.

In one embodiment, the coherent RF field has maximum coherence at the first location and wherein the coherence diminishes with increasing distance from the first location.

In one embodiment, the radio transceiver is further operable to transmit the plurality of signals using the plurality of antennas to produce a plurality of coherent RF fields, each coherent RF field carrying its own information signal.

In one embodiment, a location of one of the plurality of coherent RF fields is different from a location of another of the plurality of coherent RF fields.

In one embodiment, an information signal carried by one of the plurality of coherent RF fields is different from an information signal carried by another of the plurality of coherent RF fields.

In one embodiment, the radio transceiver is further operable to receive channel feedback information from the receiver of the information signal and use the received channel feedback information to adjust a power characteristic of the information signal.

In one embodiment, the channel feedback information comprises sounding reference signals.

In one embodiment, the channel feedback information comprises OFDM pilot-tones used for channel estimation.

In one embodiment, the channel feedback information comprises channel state information such as sent in 802.11 NDP channel sounding.

In one embodiment, the channel feedback may be a direct estimate of the MIMO channel from training symbols sent to the client device.

In one embodiment, the information signal comprises one from the group of: a Bluetooth or BLE beacon; an IEEE 802.15 beacon; and an IEEE 802.11 beacon.

In one embodiment, the information signal is transmitted using a MIMO protocol.

In one embodiment, MIMO beamforming is used to change an amplitude of the transmitted information signal.

In one embodiment, MIMO zero forcing is used to minimize the information signal received by radio receivers other than the receiver of the information signal.

In one embodiment, the information signal is transmitted using distributed MIMO.

In one embodiment, the information signal is transmitted using MU-MIMO.

In one embodiment, the radio transceiver comprises a plurality of transmitters at locations geographically different from the first location.

In one embodiment, the transmitter comprises a LTE transmitter, a 5G transmitter, a NR transmitter, or a transmitter that supports AAS.

According to another aspect of the present disclosure, a network for providing virtual beacons is provided, the network node being adapted to transmit an information signal using a transmit power level, $P_T$, and including an advertised transmit power level, $P_A$, both selected to be indicative of a distance, d, between a location of the receiver of the information signal and a first location, the first location being geographically different from the location of the radio transmitter.

According to yet another aspect of the present disclosure, a network node for providing virtual beacons comprises means to transmit an information signal using a transmit power level, $P_T$, and including an advertised transmit power level, $P_A$, both selected to be indicative of a distance, d, between a location of the receiver of the information signal and a first location, the first location being geographically different from the location of the radio transmitter.

According to yet another aspect of the present disclosure, a network node for providing virtual beacons comprises a transmitting module operable to transmit an information signal using a transmit power level, $P_T$, and including an advertised transmit power level, $P_A$, both selected to be indicative of a distance, d, between a location of the receiver of the information signal and a first location, the first location being geographically different from the location of the radio transmitter.

According to yet another aspect, the present disclosure provides a non-transitory computer readable medium storing software instructions that when executed by one or more processors of a network node, cause the network node to: transmit an information signal using a transmit power level, $P_T$, and including an advertised transmit power level, $P_A$, both selected to be indicative of a distance, d, between a location of the receiver of the information signal and a first location, the first location being geographically different from the location of the radio transmitter.

According to yet another aspect, the present disclosure provides a computer program comprising instructions which, when executed by at least one processor, cause the at least one processor to carry out any of the methods described herein.

According to yet another aspect, the present disclosure provides a carrier comprising the above-mentioned computer program, wherein the carrier is one of an electronic signal, an optical signal, a radio signal, or a computer readable storage medium.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 16 is a flow chart illustrating a method for providing virtual beacons according to another embodiment of the present disclosure.

FIG. 17 is a flow chart illustrating a method for detecting virtual beacons according to another embodiment of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The concept of a virtual beacon is presented, which enables multi-antenna systems, such as cellular radio systems, to emulate beacon signals at defined locations in a customer's site. In one embodiment, signals are sent to individual devices such that the signals detected by those devices have signal properties resembling those that would be produced by actual beacons at those defined locations. In another embodiment, signals are transmitted to a particular location to produce a coherent Radio Frequency (RF) field similar to what would be produced by an actual beacon at that location.

Examples of multi-antenna technologies that may be used for this purpose include, but are not limited to, cellular telecommunications networks. In one embodiment, Long Term Evolution (LTE) systems can use Massive Multiple Input Multiple Output (M-MIMO) antenna arrays for this purpose. It is not necessary that the intended receiver employ multi-antenna technology.

Virtual Beacons

The present disclosure presents virtual beacons, e.g., signals that are generated by Third Generation Partnership Project (3GPP) equipment and that, when detected by a User Equipment (UE) appear to come from an actual beacon at a particular location, and using multi-antenna techniques to make such signals readable only at UE devices being sufficiently close to the position of the virtual beacon. Since devices determine their relative position to a beacon based on the power level of the signal being transmitted by that beacon, the methods and systems disclosed herein provide indication to the UE of its distance from the virtual beacon by manipulation of the signal power received by the UE, which the UE uses to determine its position relative to the location of the virtual beacon. In one embodiment, the virtual beacon produced is a Bluetooth Low Energy (BLE) beacon, but the concepts described herein may be adapted to produce virtual beacons of other protocols.

Targeting a UE, Changing Actual Transmit Power

Figure 1:
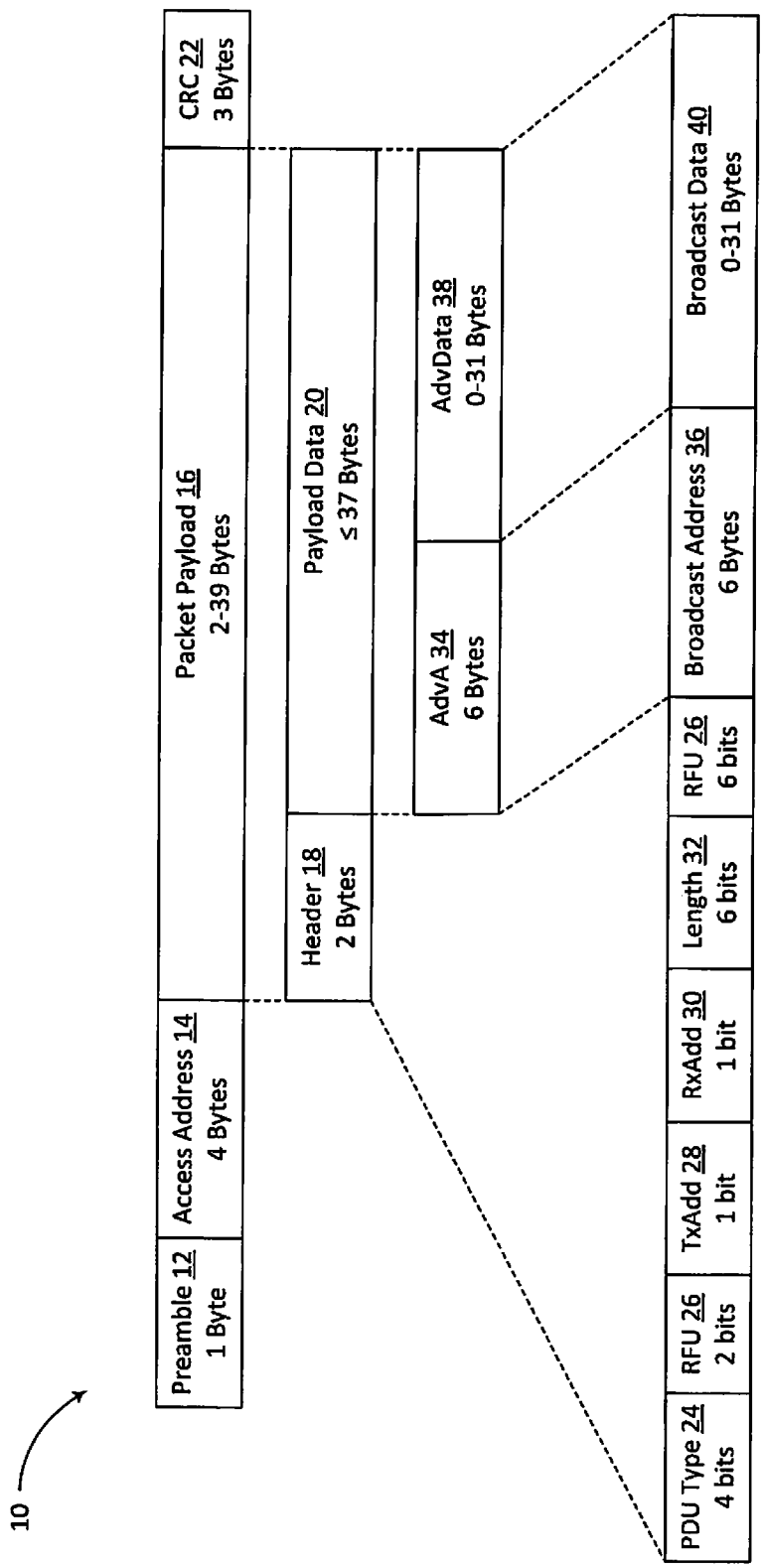
FIG. 1 illustrates the structure of a conventional Bluetooth Low Energy (BLE) beacon frame.
Figure 2:
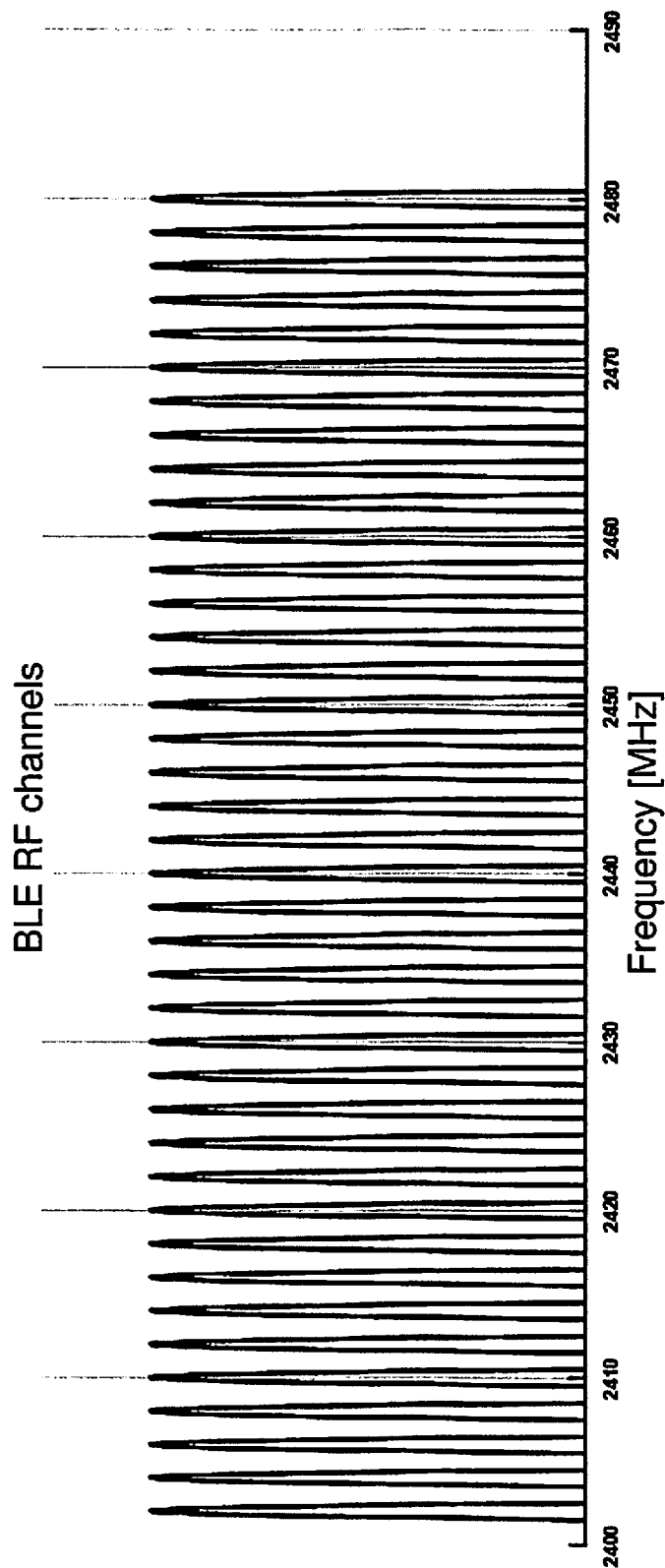
FIG. 2 illustrates the frequency locations of the forty Radio Frequency (RF) channels defined by BLE.
Figure 3:
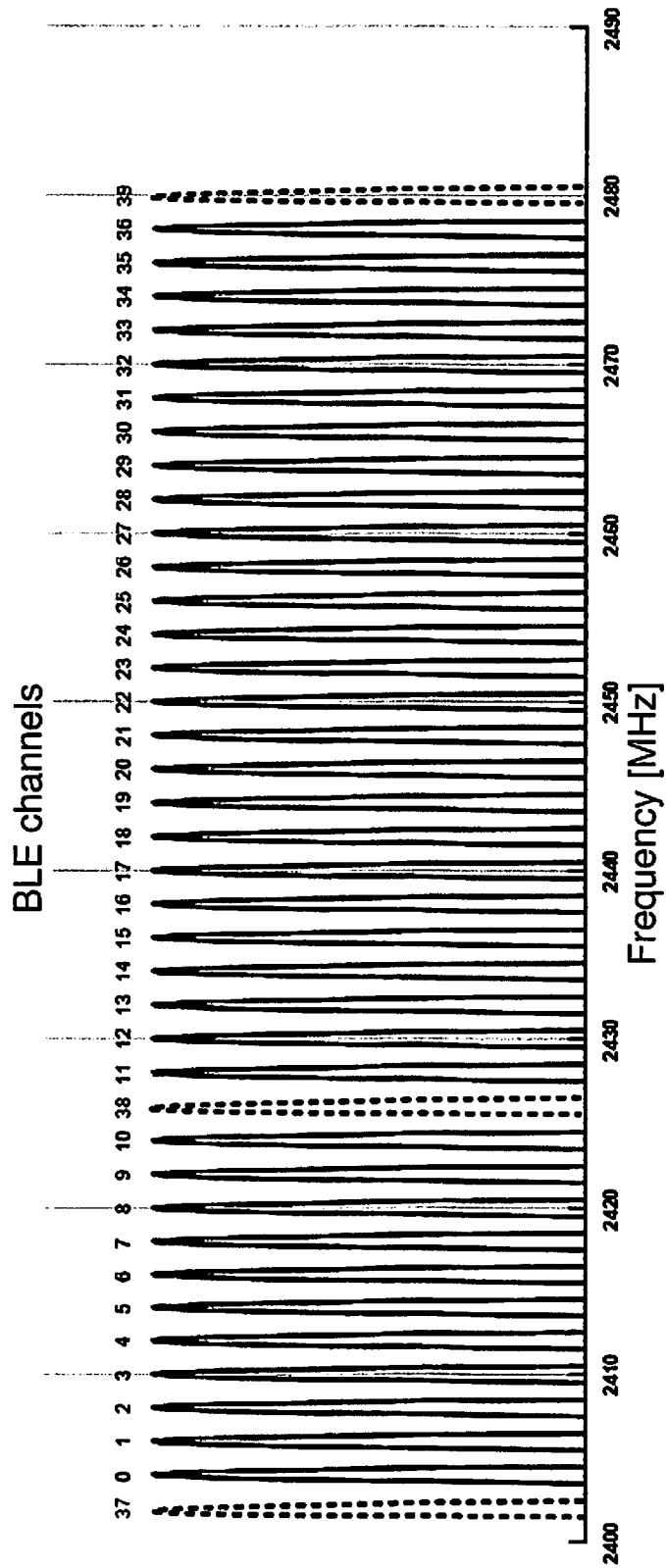
FIG. 3 illustrates the frequency locations of thirty-seven data channels and three advertising channels within the forty channels defined by BLE.
Figure 4:
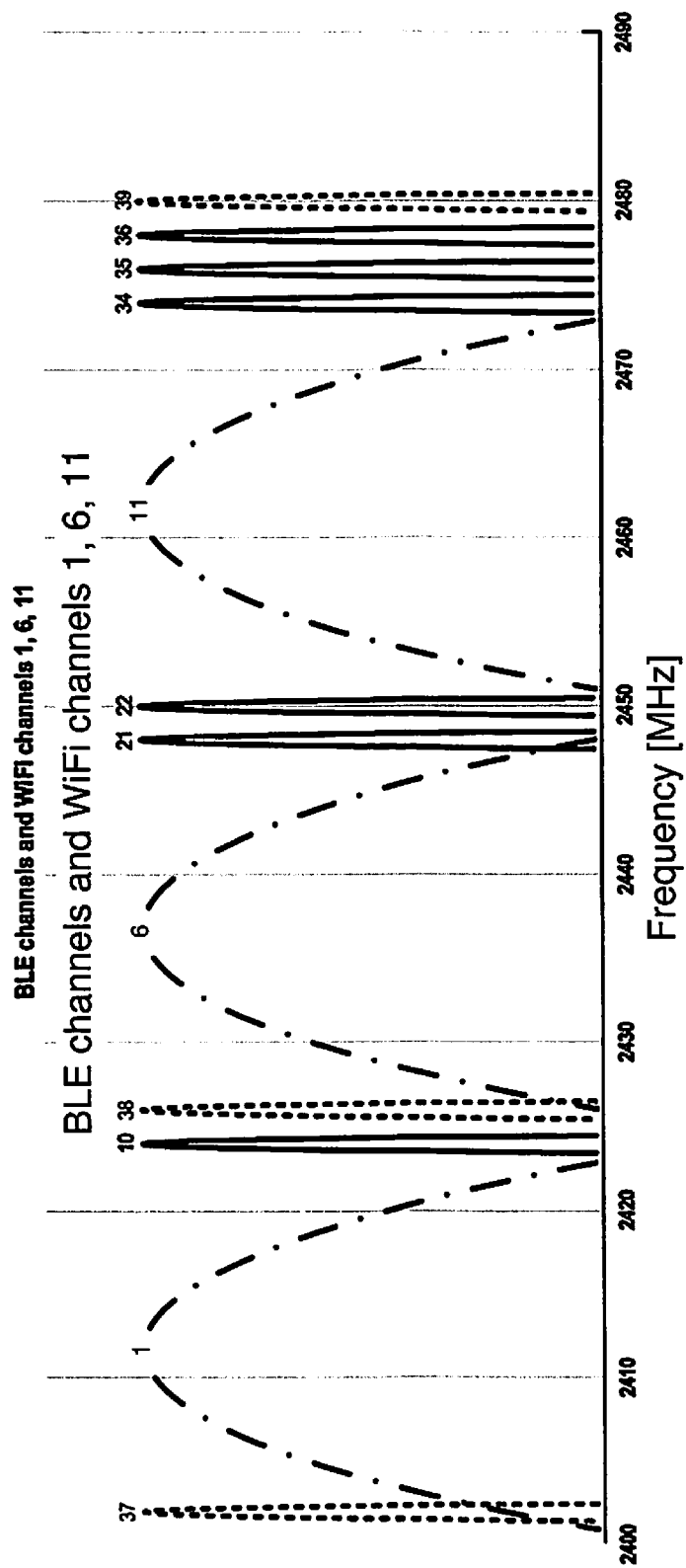
FIG. 4 illustrates the frequency locations of commonly used Wi-Fi channels relative to some of the data and advertising channels defined by BLE.
Figure 5:
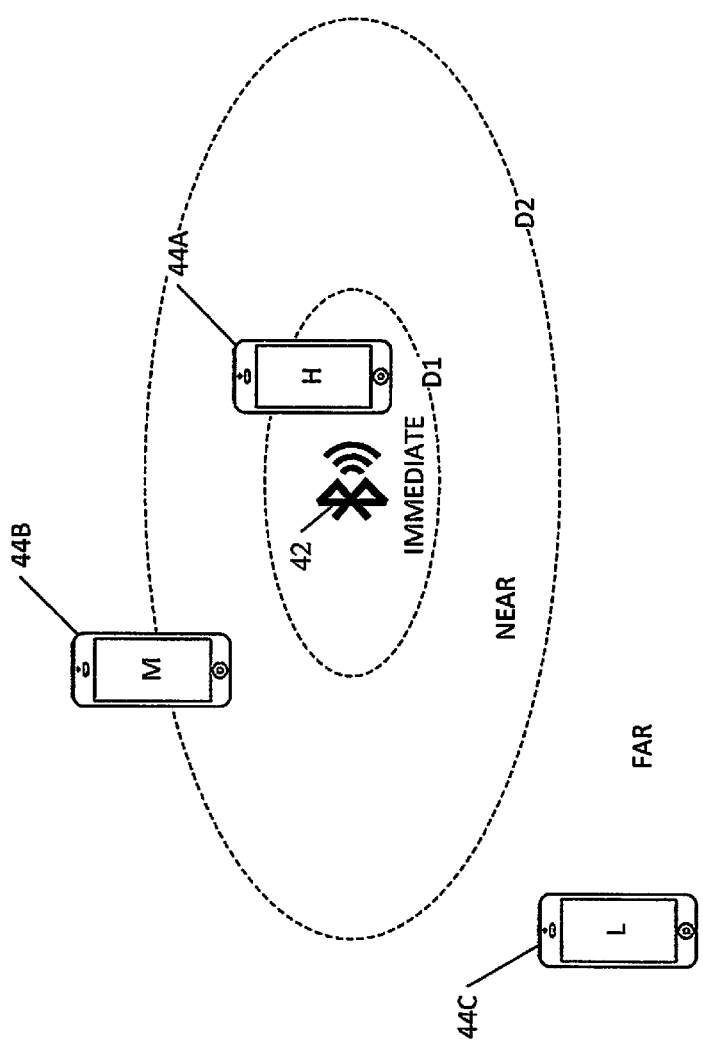
FIG. 5 illustrates a conventional deployment of an actual beacon.
Figure 6:
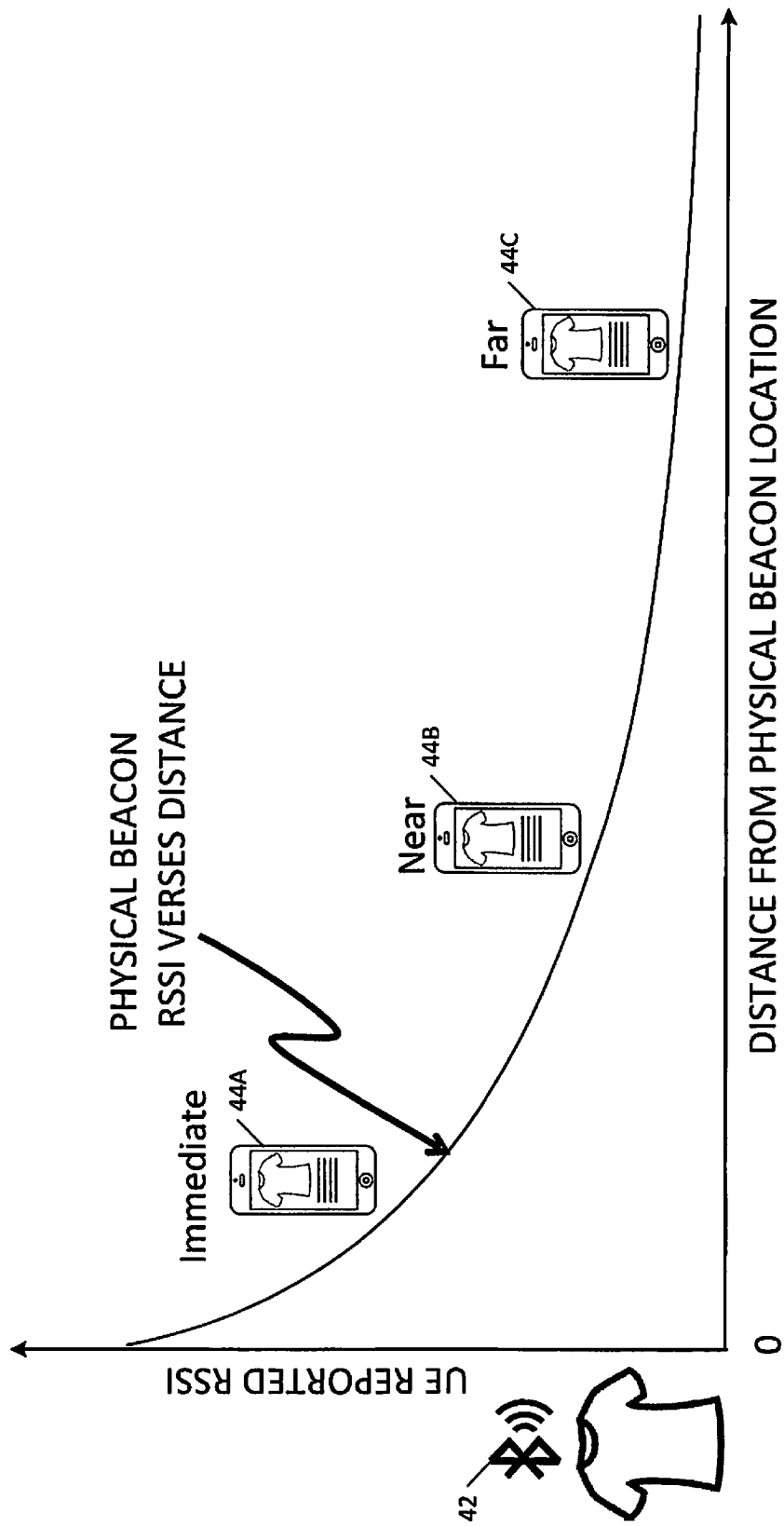
FIG. 6 is a graph illustrating the signal strength of a conventional beacon, as measured by a User Equipment (UE), versus the distance of the UE from the conventional beacon.
Figure 7:
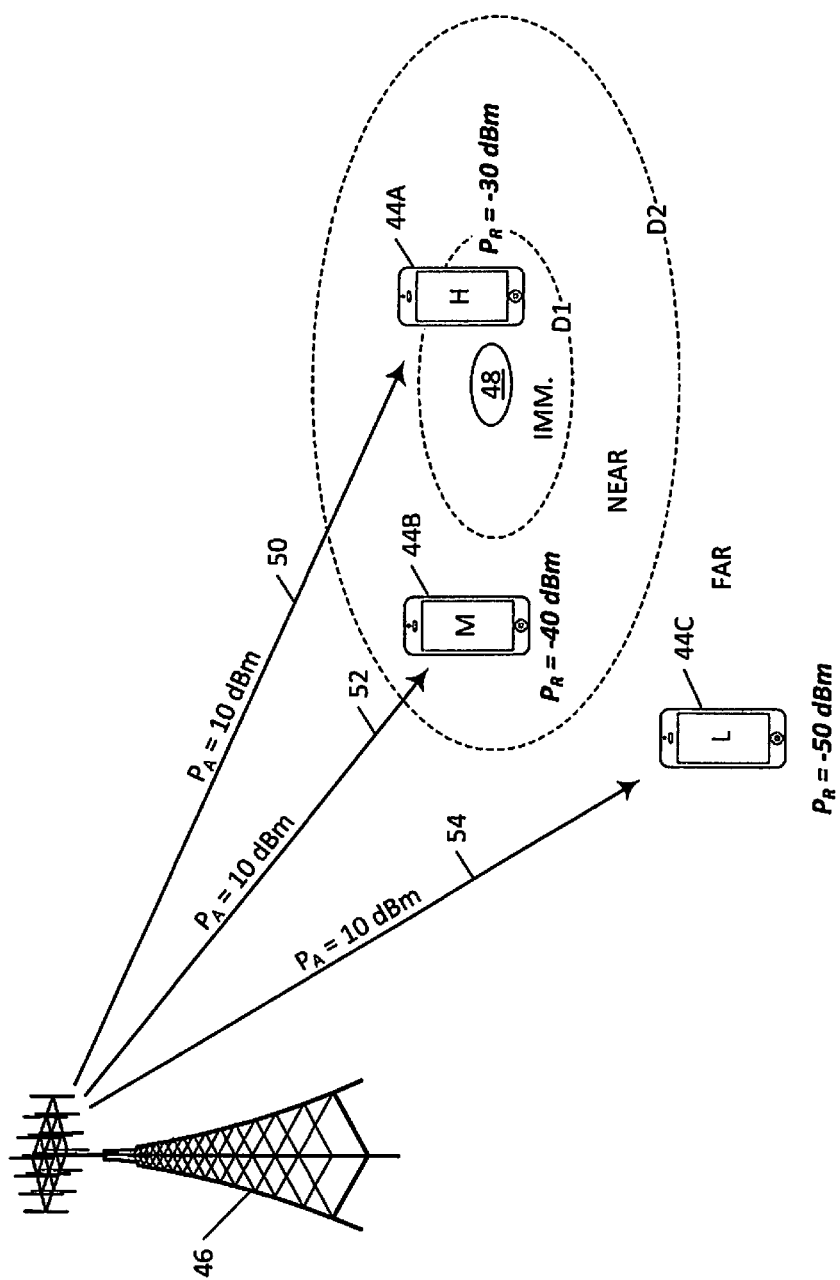
FIG. 7 illustrates a system for providing virtual beacons according to an embodiment of the present disclosure.

FIG. 7 illustrates a system for providing virtual beacons according to an embodiment of the subject matter described herein. In the embodiment illustrated in FIG. 7, a network node 46 having a multi-antenna transmitter creates a virtual beacon that appears to the UEs 44A, 44B, and 44C to be in the a same location 48 that the Bluetooth beacon 42 occupied in FIG. 5. The network node 46 accomplishes this by using multiple antennas to beam-form a transmission directed to each UE 44 such that each UE 44 receives a beacon signal having the same strength that the UE would have received from an actual beacon. Because a virtual beacon appears to be an actual beacon at a particular location, such as location 48, the terms "virtual beacon 48," "virtual beacon location 48," and "location 48" will be used synonymously herein.

In one embodiment, a multi-antenna transmitter can beam-form individual signals to each of the UEs 44, where content and/or signal strength of each signal is tailored for the target UE 44. In the embodiment illustrated in FIG. 7, for example, the UE 44A receives a signal 50 at −30 dBm, the UE 44B receives a signal 52 at −40 dBm, and the UE 44C receives a signal 54 at −50 dBm. The virtual beacon energy is maximized at each UE 44, rather than at the virtual beacon location 48. Each signal 50, 52, and 54 advertises itself as having a transmit power of 10 dBm. In order to produce a desired $P_R$, the transmitter must compensate for PL between the antenna and UE. Thus, the transmitter sends out the signals at a higher transmit power $P_T$ that accounts for both path loss PL and beamforming gain, also referred to as "coherent gain." For example, for a PL of 80 dB between the transmitter 46 and UE 44B and a beamforming gain of +20 dB, $P_T$ will be set to +20 dBm so that when the signal 52 reaches UE 44B, the $P_R$ will be −40 dBm as intended. Each of the signals 50, 52, and 54 may have their own $P_T$ independent of the others.

Using equations 1 and 2 above, the UE 44A calculates Path Loss (PL) as 10 dBm−(−30 dBm)=40 dB, which corresponds to a distance of 1 meter from the virtual beacon location 48. The UE 44B calculates PL as 10 dBm−(−40 dBm)=50 dB, which corresponds to a distance of 3 meters from the virtual beacon location 48. The UE 44C calculates PL as 10 dBm−(−50 dBm)=60 dB, which corresponds to a distance of 10 meters from the virtual beacon location 48.

In order to provide the correct relationship between received power $P_R$ and advertised transmit power $P_A$, the network node 46 needs to select a transmit power $P_T$ such that $P_R$ at the target UE is the correct value. The desired relationship between $P_R$ and $P_A$ is:

$$P_A - P_R = PL(d) \quad \text{Eq. 7}$$

where d is the apparent distance between the UE and the location of the virtual beacon. However, the network node 46 needs to take into account the distance between the transmitter antenna array and the target UE, which will determine the received power $P_R$:

$$P_T - P_R = PL(D) \quad \text{Eq. 8}$$

Combining the two equations above results in:

$$P_T - P_A = PL(D) - PL(d) \quad \text{Eq. 9}$$

Substituting the definition of PL from Equation 4 and setting both α and β equal to 20 gives:

$$P_T = \left(20\log_{10}\left(\frac{4\pi}{\lambda}\right) + 20\log_{10}(D)\right) - \quad \text{Eq. 10}$$
$$\left(20\log_{10}\left(\frac{4\pi}{\lambda}\right) + 20\log_{10}(d)\right) + P_A$$

$$P_T = 20\log_{10}(D) - 20\log_{10}(d) + P_A \quad \text{Eq. 11}$$

$$P_T = 20\log_{10}\left(\frac{D}{d}\right) + P_A \quad \text{Eq. 12}$$

Thus, in one embodiment, the network node 46 can calculate a transmit power level, $P_T$, to use based on distance, D, from the transmitter antenna array to the UE and distance, d, from the UE to the location of the virtual beacon. In alternative embodiments, this calculation may be performed by another entity or network node, which notifies the network node 46 of the values of $P_T$ and $P_A$ to be used, or performed by a combination of nodes.

PL may be calculated using other methods as well. For example, a transmitter (e.g., an Enhanced Node B (eNB)) may use other signals that it receives to estimate PL. Examples of such signals include, but are not limited to, such as 3GPP signals, Sounding Reference Signals (SRSs), uplink transmissions from UEs, etc. The transmitter may also request reports from the UEs to determine the signal strength of the eNB as seen at the UE and use these reports to determine the PL.

Figure 8:
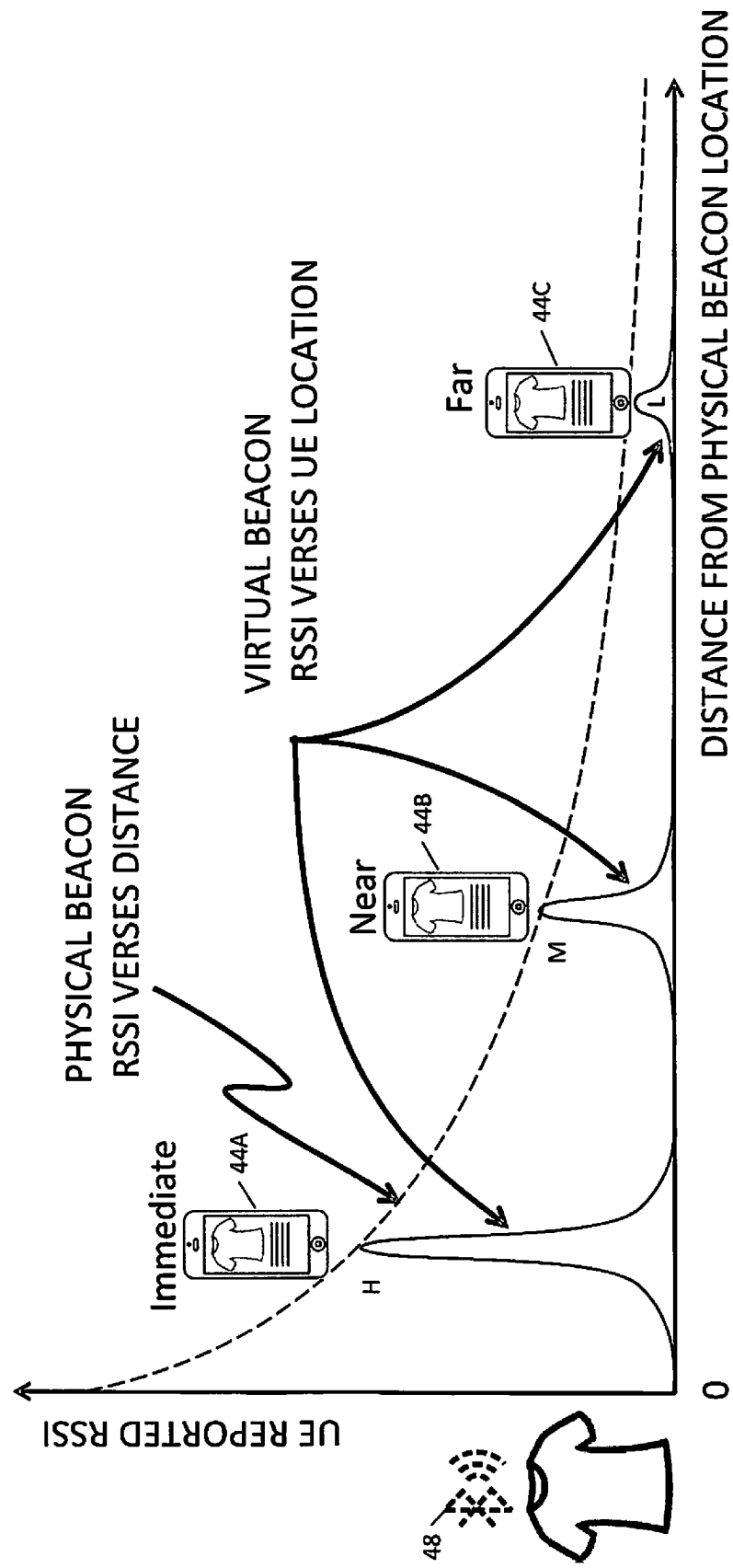
FIG. 8 is a graph illustrating the signal strength of a virtual beacon as measured by a UE, versus the distance of the UE from the conventional beacon, according to an embodiment of the present disclosure.

FIG. 8 is a graph illustrating the signal strength of a virtual beacon as measured by a UE, versus the distance of the UE from the conventional beacon, according to an embodiment of the present disclosure. In the embodiment illustrated in FIG. 8, the network node 46 operates as shown in FIG. 7, e.g., it sends a high-power signal to the UE 44A, a medium-power signal to the UE 44B, and a low-power signal to the UE 44C. FIG. 8 illustrates the point that each UE 44 receives a signal having a power that corresponds to that which would have been received by that UE 44 from an actual beacon, and from this power the distance between the UE 44 and the virtual location of the virtual beacon 48 may be calculated.

As the UE 44 moves, the network node 46 will adjust the strength of the signal directed towards that particular UE 44, to emulate the change in signal strength that the particular UE 44 would have detected from an actual beacon.

For example, if the UE 44A moves away from the location of the virtual beacon 48, the network node 46 will reduce the strength of the signal (e.g., the signal 50 in FIG. 7) to match the "Physical Beacon Received Signal Strength Indicator (RSSI) Versus Distance" curve shown in FIG. 8. Likewise, if the UE 44C moved towards the location of the virtual beacon 48, the network node 46 will increase the strength of the signal (e.g., the signal 54 in FIG. 7) accordingly.

Targeting a UE, Changing Advertised Transmit Power

Figure 9:
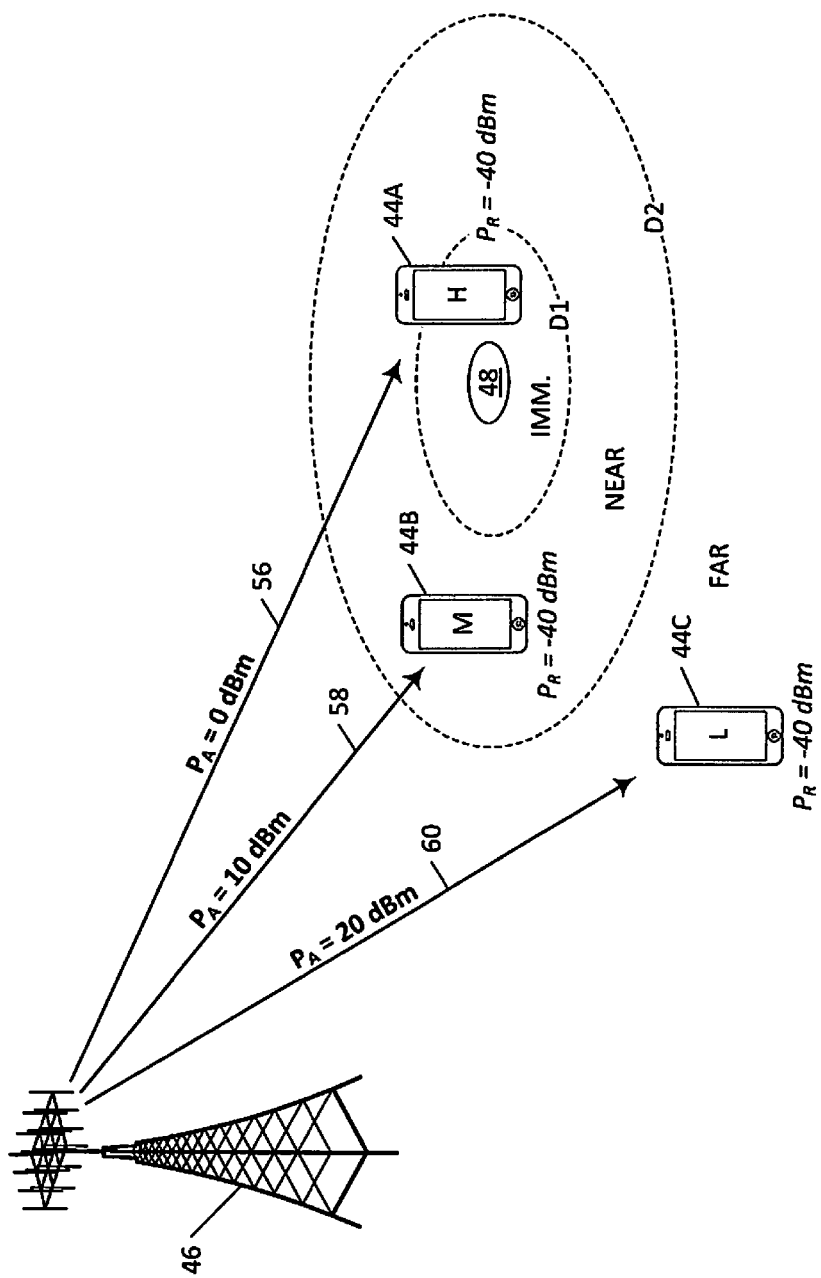
FIG. 9 illustrates a system for providing virtual beacons according to another embodiment of the present disclosure.

FIG. 9 illustrates a system for providing virtual beacons according to another embodiment of the present disclosure. In the embodiment illustrated in FIG. 9, the network node 46 sends, to each UE 44, signals that have the same actual power, but each signal's advertised power—e.g., the power at which the packet was transmitted, as reported by the packet itself via a special Information Element (IE) used for that purpose—is modified to give the UE the impression that it is close to or far from an actual beacon at the location 48.

Tx Power Level may, e.g., be defined as −127 to +127 dBm as defined in Section 1.5 of [2], although most devices limit the range to −30 to +20 dBm. This field can be used to set the UE perceived range to the target beacon location. It can here be noted that one may set a value that is higher than actually is feasible to use for transmission. In this way one can in principle allow a device to determine its distance also at large distances where it in fact a signal from a true beacon would not have been received.

In the example illustrated in FIG. 9, the network node 46 sends, to the UE 44A, a signal 56 that has a Received Power $P_R$ of −40 dBm and that advertises itself as being transmitted at 0 dBm. Using equations above, the UE 44A calculates a PL of 0 dBm−(−40 dBm)=40 dB, which corresponds to a distance of 1 meter from the virtual beacon location 48. (if the MIMO system generates the virtual beacon at −30 dBm, then the Tx Power Level can be stated as 10 dBm for the same distance.) The network node 46 sends to the UE 44B a signal 58 that also has an actual power of −40 dBm but advertises itself as being transmitted at 10 dBm. The UE 44B calculates a PL of 50 dB, which corresponds to an approximate distance of 3 meters from the virtual beacon location 48. Likewise, the UE 44C receives a −40 dBm signal 60 that advertises itself as being transmitted at 20 dBm; the UE 44C calculates a PL of 60 dB, which corresponds to a distance of 10 meters from the virtual beacon location 48.

Bluetooth devices' beacons come in different power classes based on their highest output power capabilities, as described in Section 3 of [1].

Power Class 1, Pmax=20 dBm, Pmin<=4 dBm

Power Class 2, Pmax=4 dBm, Pmin=−30 dBm (suggested)

Power Class 3, Pmax=0 dBm, Pmin=−30 dBm (suggested)

Beacons therefore have a large range of output power levels, which is why Tx Power Level is included in order for UE devices to estimate the distance to the transmitter.

Conventional beacons contain other important data type fields:

Service Universally Unique Identifier (UUID), of which there are six data types defined for the three sizes of service UUIDs:
  16-bit Bluetooth service UUIDs
  32-bit Bluetooth service UUIDs
  Global 128-bit service UUIDs
UUIDs are specified in "ISO/IEC 11578:1996 Information technology—Open Systems Interconnection—Remote Procedure Call (RPC)," "ITU-T Rec. X.667 ISO/IEC 9834-8:2005," and by IETF RFC 4122. The 16-bit and 32-bit Service UUIDs indicate customer advertising information to be sent in the specific beacons.

Local Name is the local name of the device.

Flags are omitted in non-connectable beacons.

Manufacturer Specific Data

Tx Power Level

Channel Map Update Indication

Advertising Interval

LTE Bluetooth Device Address

Virtual beacons may include all of the same information as conventional beacons. In addition to broadcasting UUID information, required for location based advertizing, and Tx Power Level required to enable UE's to estimate distance as discussed, mirtual beacons may also indicate the advertising interval, and channel map indications. Virtual beacons, although not generated from physical beacon hardware with manufacturing assigned Media Access Control (MAC) Organizational Unique Identifiers (OUIs), may have software assigned OUI's, which may be sold as through a licensing arrangement.

Virtual Beacons Using M-MIMO

The approaches described above may be implemented using standard LTE equipment, which typically uses 2×2 or 4×4 multi-antenna arrays, to generate BLE signals that are directed to specific UEs. Where there is a M-MIMO deployment, however, another approach that may be used is to create focused "bubbles" of coherent RF signal power at specific locations. In this manner, an LTE network node with M-MIMO can create a volume of space in which a beacon signal is present at levels detectable by a UE or other device.

M-MIMO, with arrays of 16, 32, 64, 128, 256, or more antennas will soon be a reality in cellular networks. The antenna arrays may be used to carry multiple spatial streams, therefore significantly increasing bandwidth (and by extension, data rate) delivered to a UE. The antenna arrays may also be used for coherent beamforming, either using predefined codebooks which typically limit the phase resolution of the antennas, or in using explicit feedback methods, which are able to generate UE specific focused beams.

Figure 10:
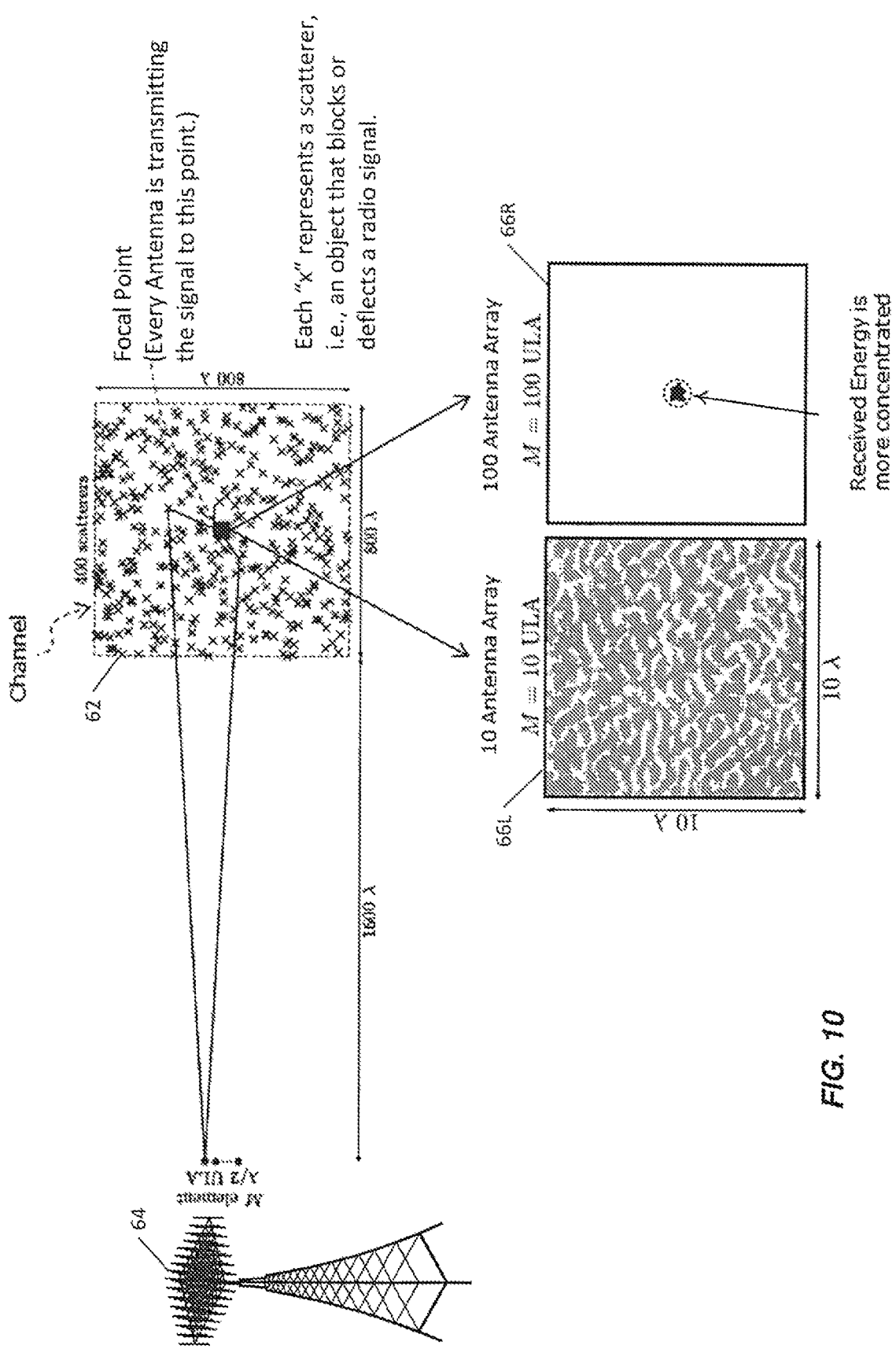
FIG. 10 illustrates the results of a Massive Multiple Input Multiple Output (M-MIMO) simulation, showing that Massive MIMO can create "bubbles" of coherent RF signal power at specific locations according to an embodiment of the present disclosure.

FIG. 10 illustrates the results of a M-MIMO simulation, showing that M-MIMO can create regions of coherent RF signal power at specific locations according to an embodiment of the present disclosure. In the simulation represented in FIG. 10, 400 "scatterers," i.e., objects which block or deflect radio signals, have been randomly placed into a simulation space 62 of 800λ×800λ (λ=wavelength), with a 100 antenna array located 1600λ away. For a frequency of 2.7 GHz, where λ=0.10 m, a M-MIMO antenna array 64 is 160 m away from a region of 80 m×80 m. A 10λ×1λ (1 m×1 m) portion of the simulation space 62 is magnified and shown as a simulation space 66. FIG. 10 shows simulation space 66 under two different simulation conditions—using a 10-antenna array (labeled "66L") and using a 100-antenna array (labeled "66R").

The simulation space 66L shows a moderately high energy level distributed throughout. The simulation space 66R shows a focused point source of energy which is at least 5 dB above that of the surrounding area.

This simulation demonstrates that M-MIMO is capable of generating focused regions of coherent RF signal power at specific locations, in areas where channel characteristics allow for high multipath. The simulation results showed a 5 dB increase in power for coherent beamforming gain over non-coherent beamforming gain, but increases as high as 10 dB are theoretically possible using 100 antennas. The theoretical beamforming gain using 256 antennas should be 24 dB (8×3 dB) over non-coherent power gain of the same 256 antennas. Given the relative low power (typically 0 dBm) of the iBeacon signal, for example, the virtual beacon need only be generated to appear as a level of −40 dBm when the UE is at a 1 m distance from the target indicator.

This capability gives rise to another implementation, in which a remote site generates a virtual beacon by creating a region of profiled beacon signal energy around the desired location, such that the RSSI of the virtual beacon combined with the advertised Tx Power Profile approximates the same RSSI verses distance profile as the physical beacon. An example of this is shown in FIG. 11.

Targeting a Location

Figure 11:
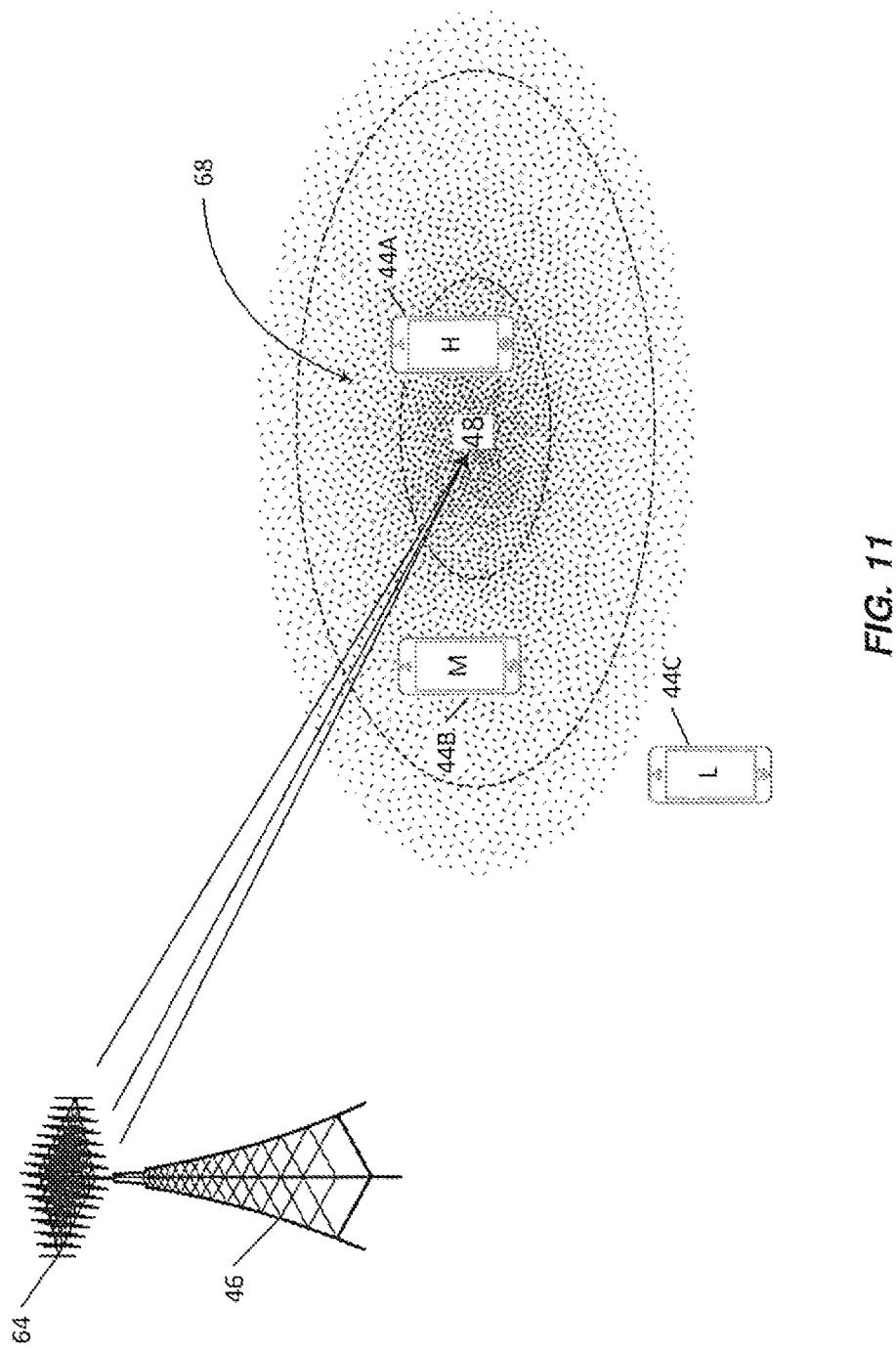
FIG. 11 illustrates a system for providing virtual beacons according to yet another embodiment of the present disclosure.

FIG. 11 illustrates a system for providing virtual beacons according to yet another embodiment of the present disclosure. In the embodiment illustrated in FIG. 11, the network node 46, which has the M-MIMO antenna array 64, creates a focused RF field 68 at the virtual beacon location 48. The RF field 68 has a high coherence at the location 48 and lower coherence farther away from the location 48. In the embodiment illustrated in FIG. 11, the UE 44A detects the RF field 68 with at high power, the UE 44B detects the RF field 68 at medium power, and the UE 44C detects the RF field 68 at low power. In one embodiment, the virtual beacon energy is maximized at the virtual beacon location 48 rather than at any particular UE. Beamforming may provide an additional power gain. For example, with a transmit power $P_T$=+30 dBm and a path loss of 75 dB, which results in a $P_R$ of −45 dBm, the use of a MIMO transmitter with 64 antennas, for example, can increase $P_R$ by 18 dB due to coherent beamforming gain (where 18=3 log 2(64)), resulting in a receive power of −27 dBm. This ensures that even though $P_T$ and $P_A$ are selected to generate the virtual beacon, in the massive MIMO case, it is $P_R$ and $P_A$ that define the virtual beacon power. In short, when calculating $P_T$ an eNB or other transmitter may consider how beamforming gain may increase received signal power $P_R$.

Figure 12:
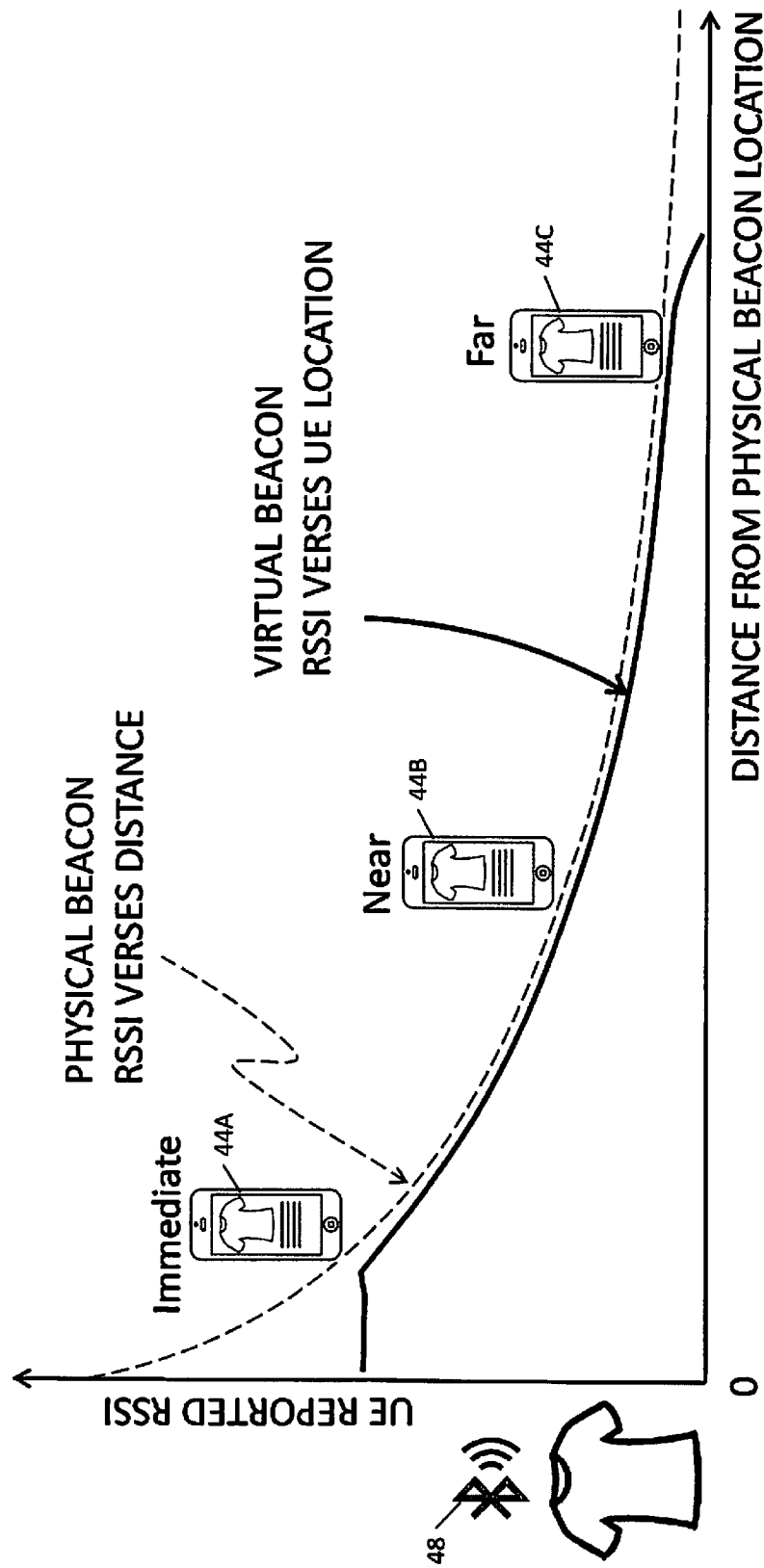
FIG. 12 is a graph illustrating the signal strength of a virtual beacon, as measured by a UE, versus the distance of the UE from the conventional beacon, according to another embodiment of the present disclosure.

FIG. 12 is a graph illustrating the signal strength of a virtual beacon created by the M-MIMO antenna array 64 as measured by a UE, versus the distance of the UE from the virtual beacon location 48, according to another embodiment of the present disclosure. The solid line graph represents the level of coherence of multiple RF signals transmitted to the same location 48, which results in a power reading (e.g., RSSI) that a UE would make at that distance from the virtual beacon location 48. That is, the RSSI of the virtual beacon approximates the same RSSI verses distance profile as the physical beacon.

The remote site ability to model "immediate" proximity depends on the power of the remote site, the immediate distance, and the specified Tx Power Level of the virtual beacon. It is expected that the remote site will reach a maximum energy limited by many factors, such as regulatory, distance, antenna array factor, etc.

The subject matter disclosed herein takes advantage of the capabilities of beamforming. For example, M-MIMO with 256 antenna elements will enable focused beamforming gains as much as 24 dB greater than the non-beamformed transmitted power. This means that the non-beamformed power (i.e. the conducted power plus antenna gain) can be reduced so that the transmitted power level, $P_T$, is too weak to be recovered anywhere in the cell except where the additional beamforming power makes it have sufficiently high enough Signal to Interference plus Noise Ratio (SINR) to recover. As a result, the virtual beacon can be made to only be recovered at desired locations, e.g., close to first location, within the cell.

In addition, M-MIMO at the transmitter can be used to direct NULLs toward receivers within the cell that are not near the desired first locations. These two capabilities with M-MIMO—the ability to focus an information signal at receivers near the location of the virtual beacon and the ability to focus a NULL signal (which cancels or obscures the information signal) at receivers not near the location of the virtual beacon—enable the eNB to control whether the virtual beacon is recoverable or not throughout the cell, and across many different receivers.

It should be noted that systems that operate as disclosed herein need not be limited to using just one of the multiple approaches described above, but may use one or more techniques simultaneously. For example, a network node 46 may generate the coherent RF field 68 as shown in FIG. 11 to create one virtual beacon and use the targeted-UE techniques shown in FIGS. 7 and 9 to create other virtual beacons. Likewise, the coherent RF field 68 may be produced while including changes to the advertised Tx Power Level with respect to distance of the UE from the location.

The actual power adjustments, as shown in FIG. 7, and the advertised power adjustments, as shown in FIG. 9, may be adjusted in a stepwise or continual fashion. It should be noted, however, that, while these implementations are practical, the use of such techniques may make it possible for a UE to detect that it is dealing with a virtual beacon rather than an actual beacon: actual beacons usually do not dynamically change the Tx Power Level, and detected power from actual beacons usually does not change in a stepwise fashion but instead continually with a change of distance to the actual beacon. This gives rise to the possibility of a UE that is programmed to reject signals from what it determines is a virtual, rather than actual, beacon. The continual power adjustment technique such as described in FIG. 7 and the coherent RF field technique such as described in FIG. 9 are less likely to be detected by the UE as being a virtual, rather than actual, beacon.

As used herein, the terms "multiple antennas," "multi-antenna arrays," and similar are not intended to be limited just to antennas that are collocated with each other, but may be implemented by sets of antennas or sets of antenna arrays that are not collocated with each other, e.g., that are geographically distinct from each other.

The methods described herein may be used to create virtual beacons that appear to broadcast continuously, continually, periodically, or aperiodically.

Figure 13:
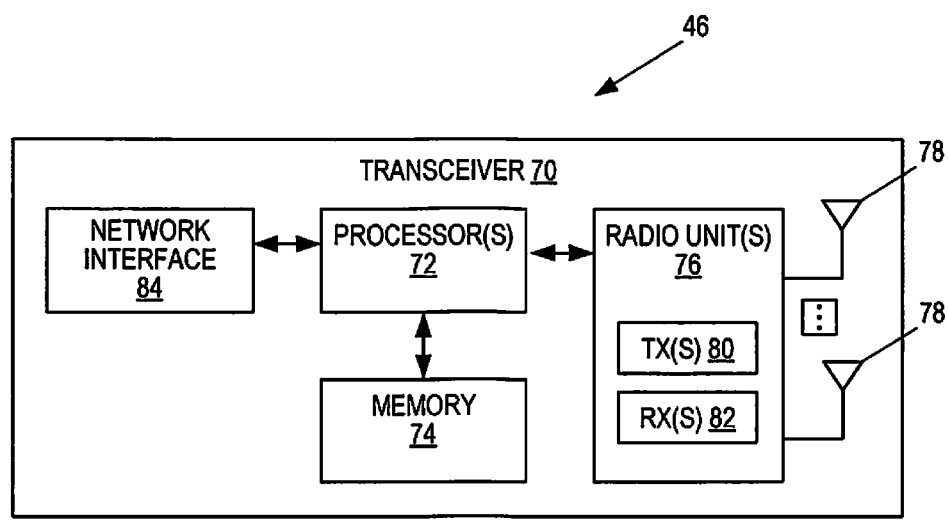
FIG. 13 is a network node for providing virtual beacons according to another embodiment of the present disclosure.

FIG. 13 is a network node for providing virtual beacons according to another embodiment of the present disclosure. In the embodiment illustrated in FIG. 13, the network node 46 includes a transceiver 70, the transceiver 70 including one or more processors 72 and memory 74 storing instructions executable by the one or more processors 72. In the embodiment illustrated in FIG. 13, the network node 46 includes one or more radio units 76 attached to multiple antennas 78 and having one or more transmitters 80 and one or more receivers 82. In the embodiment illustrated in FIG. 13, the transceiver 70 includes a network interface 84, which may be used for communicating with another network node or a core network, for example.

Figure 14:
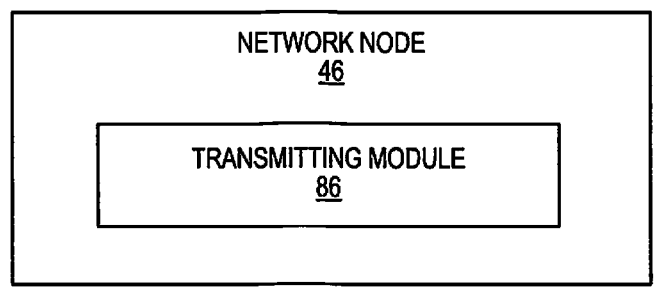
FIG. 14 is a network node for providing virtual beacons according to yet another embodiment of the present disclosure.

FIG. 14 is a network node for providing virtual beacons according to yet another embodiment of the present disclosure. In the embodiment illustrated in FIG. 14, the network node 46 includes a transmitting module 86 for transmitting an information signal using a transmit power level, $P_T$, and including an advertised transmit power level, $P_A$, both selected to be indicative of a distance, d, between a location of the receiver of the information signal and a first location, the first location being geographically different from the location of the radio transmitter.

Figure 15:
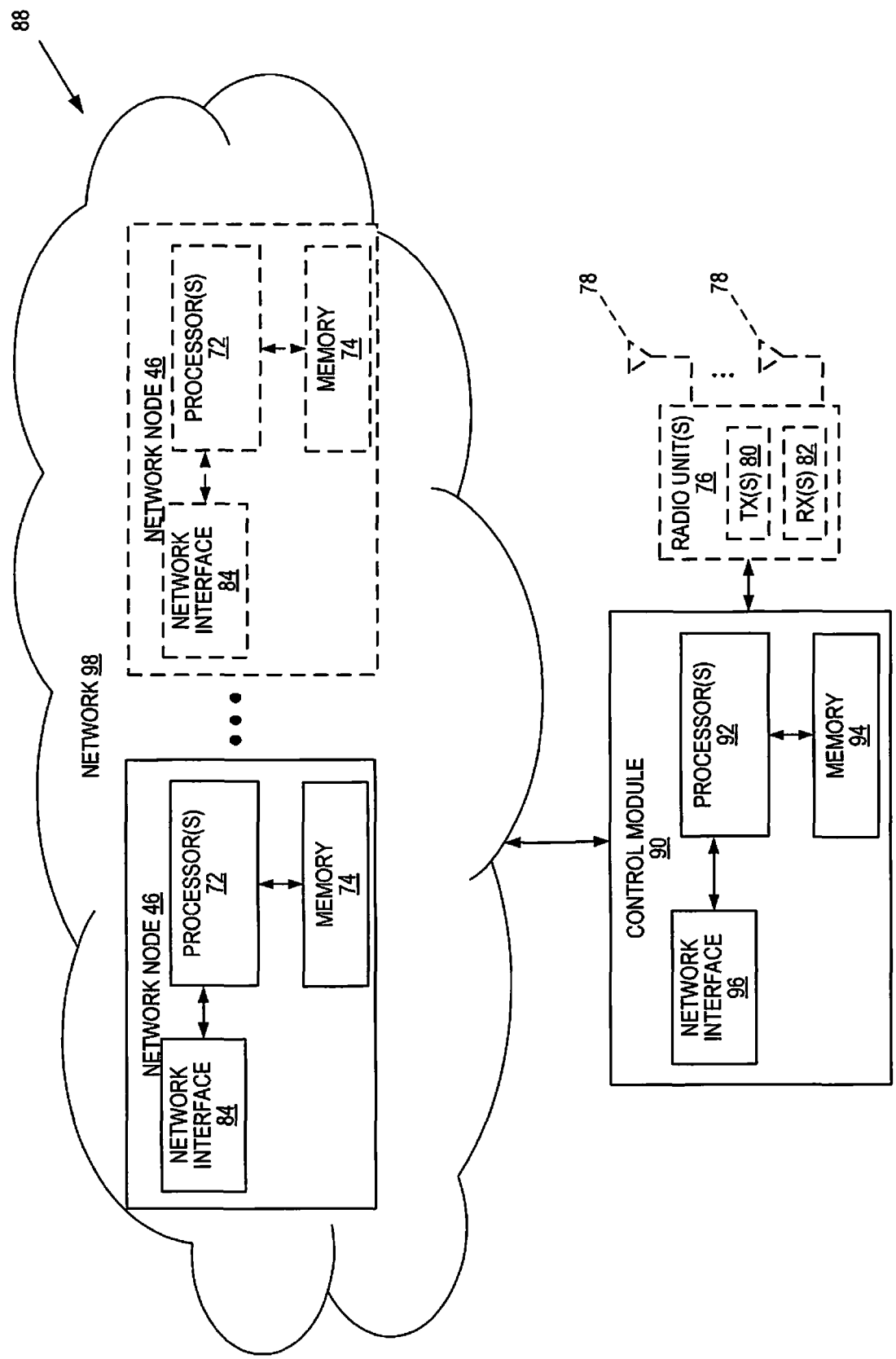
FIG. 15 is a virtual network node for providing virtual beacons according to another embodiment of the present disclosure.

FIG. 15 is a virtual network node 88 for providing virtual beacons according to another embodiment of the present disclosure. In the embodiment illustrated in FIG. 15, the virtual network node 88 includes a control module 90 for controlling the operation of one or more of the network nodes 46. In the embodiment illustrated in FIG. 15, the control module 90 includes one or more processors 92 and memory 94 storing instructions executable by the one or more processors 92, as well as a network interface 96 for communicating with another network node or a telecommunication network 98. In one embodiment, the virtual network node 88 may include the one or more radio units 76 attached to the multiple antennas 78 and having the one or more transmitters 80 and the one or more receivers 82. The virtual network node 88 is operable to transmit an information signal using a transmit power level, $P_T$, and including an advertised transmit power level, $P_A$, both selected to be indicative of a distance, d, between a location of the receiver of the information signal and a first location, the first location being geographically different from the location of the radio transmitter.

FIG. 16 is a flow chart illustrating a method for providing virtual beacons according to another embodiment of the present disclosure. In the method illustrated in FIG. 16, step 100 includes transmitting, by a transmitter at a second location physically different from a first location, an information signal using a transmit power $P_T$ and including an advertised transmit power level $P_A$, both selected to be indicative of a distance, d, between a location of a receiver of the information signal and the first location. The information signal may be transmitted continuously, continually, periodically, or aperiodically (e.g., based on a trigger or detection of a need to transmit). In embodiments where the signals are directed to UEs in the vicinity of a virtual beacon location (rather than being directed to the virtual beacon location itself), the transmitter may pause or halt the process if it detects that there are no UEs in the vicinity of the virtual beacon location.

FIG. 17 is a flow chart illustrating a method for detecting virtual beacons according to another embodiment of the present disclosure. In the embodiment illustrated in FIG. 17, the method includes receiving the information signal (step 200) at a receiver, determining a received power, $P_R$, and an advertised power, $P_A$, for the information signal (step 202), and providing, to the transmitter of the information signal, feedback about the received power, $P_R$, of the information signal (step 204). In one embodiment, the feedback may include channel feedback, such as RSSI. In one embodiment, the transmitter of the information signal may uses this feedback to adjust the transmitted power of the information signal so that the information signal is received by the receiver of the information signal at a desired receiver power level, $P_R$. In this manner, the network node 46 or the system in which it operates can compensate for exiting environmental conditions—both static and dynamic—that contribute to PL and compensate accordingly.

Although the examples presented above use power levels to convey distance to a virtual beacon, other transmission characteristics may also be used. For example, in one embodiment, the network node 46 may use Wi-Fi round trip delay messages for that purpose.

Advantages

The virtual beacons and associated concepts described herein have several advantages over conventional beacons:

The subject matter of the present disclosure includes means to enable beacons to operate with multiple transmission power levels, configurable on a per virtual beacon basis, or as specified by the store owner so as to include nearby pedestrian or vehicular traffic. What this means is that the store owner may configure some beacons to have very small coverage areas, perhaps only one to a few meters radius, while other beacons outside the store may be configured to have larger coverage areas or perhaps tens or hundreds of meters.

The subject matter of the present disclosure also enables beacons to be located anywhere, inside or outside of the customers' premises, for example, at the entrance locations to the mall where the customers' store is located, or perhaps in a nearby high pedestrian traffic location near the store.

The subject matter of the present disclosure addresses the issue of battery life, by removing the need for batteries, since the beacons are maintained as part of the cellular network.

The subject matter of the present disclosure eliminates theft and damage. Virtual beacons cannot be stolen, marked, or damaged.

The subject matter of the present disclosure provides network connectivity to the beacon generation software. Virtual beacons are generated by network software, and can be upgraded without making changes to the locations or configuration of the beacons.

The subject matter of the present disclosure enables corporate deployments of beacons, with consistent configurations and operation, so that control is maintained over the management of this type of advertising.

The subject matter of the present disclosure couples UE location information with M-MIMO technology, to generate location specific beacon signals around individual UEs.

The subject matter of the present disclosure further changes the signal strength of the generated beacon signal, based on the relative location of the UE to a customer defined location.

The subject matter of the present disclosure defines the means to generate all of the useful operational characteristics of beacons using technology to generate virtual beacons, thus avoiding all of the problems associated with real physical beacons.

The subject matter of the present disclosure leverages M-MIMO technology to offer a new previously not considered business offer, which may be sold to service providers as a software upgradable feature.

The subject matter of the present disclosure is ecologically friendly, helping to eliminate the proliferation of physical technology requiring disposable batteries, where the technology itself will require disposal.

The subject matter of the present disclosure enables new capabilities for beacons, by removing locations restrictions and enabling customers to place beacons in previously inaccessible locations, such as at the entrance of a mall, in a food court near the customers' store, or the virtual beacon may be located at a seat in a movie theatre for "you have been selected . . . " targeted advertising.

The subject matter of the present disclosure enables new opportunities for E911 by providing locations of means of egress, such as fire exits and/or egress paths to exits.

The subject matter of the present disclosure enables virtual beacons to be transmitted with different Tx Power Levels, thus, creating the perception of greater distances to the desired beacon location. Beacons may be transmitted with lower Tx Power Levels to enable finer location tracking to specific locations within a venue. These power levels enable distances to be calculated in a qualitative way, for example, in different ranges of immediate (within 50 centimeters), near (between 50 centimeters and up to 5 meters), and far (from 2-5 meters, and up to 30-50 meters).

The subject matter of the present disclosure enables cellular networks to send notification information to the UE devices, such as advertising the availability of specific services in a region, since beacons may be used to trigger UE notifications, while not requiring the 3GPP network to be operating.

The subject matter of the present disclosure enables customers to deploy as many virtual beacons as desired, without having to purchase, configure, and maintain physical hardware, verify batteries or network configuration, or deal with theft and vandalism.

The subject matter of the present disclosure enables beacons to be managed in groups, as a service. Hardware beacons must be managed individually; however, virtual beacons may be mass programmed, using an application, so that all virtual beacons for a store, or chain of stores, can be reprogrammed to advertise the same corporate webpage.

Virtual beacons also avoid RF shadowing problems experienced by regular beacons where signals are attenuated by walls or poles, causing large errors in distance calculations. Virtual beacons may leverage cellular fingerprinting data to further improve, on a user by user basis, the received signal strength.

Virtual beacons may be UE directed, and need not be generic. For example, the virtual beacon transmitted to one UE may advertise a 15% discount, while the virtual beacon transmitted to another UE may advertise a 25% discount.

Virtual beacons may help to mitigate spoofing, by periodically changing their beacon settings, and applying these changes with application feedback loop. For example, Walmart may decide to update their iOS application, to accept notifications from a new set of beacon Identifiers (IDs), after a nationwide change of their virtual beacons transmitted by the networks.

Virtual beacon locations may be identified using a sticker. Configuration of the location may be achieved either using a UE device, which is located by the 3GPP network, or by features of the sticker, such as the ability to generate intermodulation products.

Virtual beacons can perform all of the current sets of defined operations for physical beacons, while introducing new, yet unknown capabilities.

The following acronyms are used throughout this disclosure.

| | |
|---|---|
| 3GPP | Third Generation Partnership Project |
| 5G | Fifth Generation |
| AAS | Advanced Antenna System |
| BLE | Bluetooth Low Energy |
| CPU | Central Processing Unit |
| CRC | Cyclic Redundancy Check |
| dBm | Decibel-Milliwatts |
| eNB | Enhanced or Evolved Node B |
| IE | Information Element |
| ID | Identifier |
| IoT | Internet of Things |
| ISM | Industrial Scientific Medical |
| ITU-T | International Telecommunication Union, Telecommunication Standardization Sector |
| LTE | Long Term Evolution |
| MAC | Media Access Control |
| MHz | Megahertz |
| MIMO | Multiple Input Multiple Output |
| M-MIMO | Massive Multiple Input Multiple Output |
| MU-MIMO | Multiple User Multiple Input Multiple Output |
| MTC | Machine Type Communication |
| NDP | Null Data Packet |
| NR | New Radio |
| OFDM | Orthogonal Frequency Division Multiplexing |
| OS | Operating System |
| OUI | Organizational Unique Identifier |
| PDU | Protocol Data Unit |
| PL | Pathloss |
| POI | Point of Interest |
| RF | Radio Frequency |
| RFC | Request for Comments |
| RFU | Reserved for Future Use |
| RPC | Remote Procedure Call |
| RSSI | Received Signal Strength Indicator |
| Rx | Receive |
| SRS | Sounding Reference Symbol |
| SINR | Signal to Interference plus Noise Ratio |
| Tx | Transmit |
| UE | User Equipment |
| UUID | Universally Unique Identifier |

The following terms are used throughout this disclosure.

| | |
|---|---|
| Beacon | A wireless, transmit-only device |
| iBeacon | Apple, Inc. BLE beacon standard |
| vBeacon | virtual beacon |

Those skilled in the art will recognize improvements and modifications to the embodiments of the present disclosure. All such improvements and modifications are considered within the scope of the concepts disclosed herein and the claims that follow.

REFERENCES

[1] Bluetooth Core Specification v 5.0, Specification of the Bluetooth System, Specification Volumes 0-7, Covered Core Package Version: 5.0, Publication Date: Dec. 6, 2016.
[2] AUTHOR UNKNOWN, "Supplement to the Bluetooth Core Specification: Specification of the Bluetooth® System," CSS Version 7, Publication Date: Dec. 6, 2016.
[3] UUIDs are standardized by the Open Software Foundation (OSF) as part of the Distributed Computing Environment (DCE).
[4] UUIDs are documented as part of ISO/IEC 11578:1996 "Information technology Open Systems Interconnection—Remote Procedure Call (RPC)" and more recently in.
[5] ITU-T Rec. X.667 ISO/IEC 9834-8:2005. Information technology—Open Systems Interconnection—Procedures for the operation of OSI Registration Authorities: Generation and registration of Universally Unique Identifiers (UUIDs) and their use as ASN.1 object identifier components.
[6] RFC 4122, A Universally Unique IDentifier (UUID) URN Namespace.

What is claimed is:

1. A method for providing a virtual beacon at a first location, the method comprising:
transmitting, by a transmitter at a second location geographically different from the first location, a beacon using a transmit power level, $P_T$, and including an advertised transmit power level, $P_A$, both selected such that, at a receiver of the beacon, a difference between the $P_A$ and a received power level, $P_R$, of the beacon will be indicative of a distance, d, between a location of a receiver of the beacon and the first location,
wherein transmitting the beacon comprises:
determining the distance, d, between the location of the receiver and the first location;
determining the advertised transmit power level, $P_A$, and the received power level, $P_R$, of the beacon such that the difference between the $P_A$ and the $P_R$ is indicative of the distance, d, between the location of the receiver of the beacon and the first location;
determining the transmit power level, $P_T$, required to achieve the determined received power level, $P_R$, at the location of the receiver; and
wherein the beacon received by the receiver has the received power level, $P_R$, that emulates a received power level, $P_R$, of a signal that would have been received by the receiver from an actual beacon located at the first location.

2. The method of claim 1 wherein determining the transmit power level, $P_T$, comprises determining $P_T$ according to the equation:

$$P_T = \text{pathloss}(D_R) - \text{pathloss}(d) + P_A$$

where $D_R$ is a distance from the transmitter to the receiver of the beacon.

3. The method of claim 2 wherein determining the transmit power level, $P_T$, comprises determining $P_T$ according to the equation:

$$P_T = 20 \log_{10}\left(\frac{D_R}{d}\right) + P_A$$

where $D_R$ and d are in meters.

4. The method of claim 1 wherein the transmitter transmits a plurality of beacons, one to each of a plurality of receivers of the corresponding beacon, each beacon having its own received power level, $P_R$, at the corresponding receiver.

5. The method of claim 4 wherein a received power level, $P_R$, of one of the transmitted beacons is different from a received power level, $P_R$, of another of the transmitted beacons.

6. The method of claim 4 wherein one of the transmitted beacons is of a different signal type, signal frequency, or signal protocol than another of the transmitted beacons.

7. The method of claim 1 comprising maintaining the select advertised transmit power level, $P_A$, at a constant value and adjusting the select transmit power level, $P_T$, as the distance, d, between the location of the receiver of the beacon and the first location changes.

8. The method of claim 1 comprising maintaining the select transmit power level, $P_T$, at a constant level and adjusting the select advertised transmit power level, $P_A$, as the distance, d, between the location of the receiver of the beacon and the first location changes.

9. The method of claim 1 comprising adjusting both the select transmit power level, $P_T$, and the select advertised transmit power level, $P_A$, as the distance, d, between the location of the receiver of the beacon and the first location changes.

10. The method of claim 1 wherein transmitting the beacon comprises:
   determining the distance, $D_L$, between the location of the transmitter of the beacon and the first location;
   determining a received power level, $P_R$, and $P_A$ of the beacon that is indicative of the distance, d, between the location of the receiver of the beacon and the first location;
   determining the transmit power level, $P_T$, required to achieve the determined received power level, $P_R$; and
   transmitting, to the location of the receiver of the beacon, the beacon having the determined transmit power level, $P_T$.

11. The method of claim 10 wherein determining the transmit power level, $P_T$, comprises determining $P_T$ according to the equation:

$$P_T = \text{pathloss}(D_L) + P_A.$$

12. The method of claim 11 wherein determining the transmit power level, $P_T$, comprises determining $P_T$ according to the equation:

$$P_T = 20 \log_{10}(D_L) + P_A$$

where $D_L$ is in meters.

13. The method of claim 10 wherein transmitting the beacon comprises:
   configuring a plurality of antennas to generate a plurality of signals having amplitude and phase relationships such that a coherent radio frequency, RF, field is produced at the first location; and
   transmitting the plurality of signals using the plurality of antennas such that the coherent RF field is produced at the first location, the coherent RF field carrying the beacon and having a power profile relative to the first location such that a received power level, $P_R$, emulates a received power level, $P_R$, of a signal that would have been produced by a conventional beacon at the first location.

14. The method of claim 13 wherein the coherent RF field has maximum coherence at the first location and wherein the coherence diminishes with increasing distance from the first location.

15. The method of claim 13 further comprising transmitting the plurality of signals using the plurality of antennas to produce a plurality of coherent RF fields, each coherent RF field carrying its own beacon.

16. The method of claim 15 wherein a location of one of the plurality of coherent RF fields is different from a location of another of the plurality of coherent RF fields.

17. The method of claim 15 wherein a beacon carried by one of the plurality of coherent RF fields is different from a beacon carried by another of the plurality of coherent RF fields.

18. The method of claim 1 further comprising receiving channel feedback information from the receiver of the beacon and using the received channel feedback information to adjust the transmit power level, $P_T$, and/or the advertised transmit power level, $P_A$, of the beacon.

19. The method of claim 18 wherein the channel feedback information comprises at least one from the group of:
   sounding reference signals;
   Orthogonal Frequency Division Multiplexing, OFDM, pilot-tones used for channel estimation;
   channel state information;
   Null Data Packet, NDP, channel sounding information; and
   a direct estimate of a channel derived from training symbols sent to the receiver of the beacon.

20. The method of claim 1 wherein the beacon comprises at least one from the group of:
   a Bluetooth or Bluetooth Low Energy, BLE, beacon;
   an Institute of Electrical and Electronic Engineers, IEEE, 802.15 beacon; and
   an IEEE 802.11 beacon.

21. The method of claim 1 wherein the beacon is transmitted using a Multiple Input Multiple Output, MIMO, protocol.

22. The method of claim 21 wherein MIMO beamforming is used to change an amplitude of the transmitted beacon.

23. The method of claim 21 wherein MIMO zero forcing is used to minimize the beacon received by radio receivers other than the receiver of the beacon.

24. The method of claim 21 wherein the beacon is transmitted using distributed MIMO.

25. The method of claim 21 further comprising generating a plurality of beacons by a plurality of transmitters.

26. The method of claim 21 wherein the beacon is transmitted using Multiple User MIMO, MU-MIMO.

27. The method of claim 1 wherein the transmitting step is performed by a plurality of transmitters at locations geographically different from the first location.

28. The method of claim 1 wherein the transmitter comprises a Long Term Evolution (LTE) transmitter, a Fifth Generation (5G) transmitter, a New Radio (NR) transmitter, or a transmitter that supports Advanced Antenna Systems (AAS).

29. A radio transceiver, comprising:
   a radio transmitter;
   one or more processors; and
   memory storing instructions executable by the one or more processors, whereby the radio transceiver is operable to:
      transmit a beacon using a transmit power level, $P_T$, and including an advertised transmit power level, $P_A$, both selected such that, at a receiver of the beacon, a difference between the $P_A$ and a received power level, $P_R$, of the beacon will be indicative of a distance, d, between a location of a receiver of the beacon and a first location, the first location being geographically different from a location of the radio transmitter,
   wherein, to transmit the beacon, the radio transceiver is further configured to:
      determine the distance, d, between the location of the receiver and the first location;

determine the advertised transmit power level, $P_A$, and the received power level, $P_R$, of the beacon such that the difference between the $P_A$ and the $P_R$ is indicative of the distance, d, between the location of the receiver of the beacon and the first location;

determine the transmit power level, $P_T$, required to achieve the determined received power level, $P_R$, at the location of the receiver; and wherein the beacon received by the receiver has the received power level, $P_R$, that emulates a received power level, $P_R$, of a signal that would have been received by the receiver from an actual beacon located at the first location.

30. A non-transitory computer readable medium storing software instructions that when executed by one or more processors of a network node, cause the network node to:

transmit a beacon using a transmit power level, PT, and including an advertised transmit power level, PA, both selected such that, at a receiver of the beacon, a difference between the PA and a received power level, PR, of the beacon will be indicative of a distance, d, between a location of a receiver of the beacon and a first location, the first location being geographically different from a location of a radio transmitter, wherein, to transmit the beacon, the radio transceiver is further configured to:

determine the distance, d, between the location of the receiver and the first location;

determine the advertised transmit power level, $P_A$, and the received power level, $P_R$, of the beacon such that the difference between the $P_A$ and the $P_R$ is indicative of the distance, d, between the location of the receiver of the beacon and the first location;

determine the transmit power level, $P_T$, required to achieve the determined received power level, $P_R$, at the location of the receiver; and wherein the beacon received by the receiver has the received power level, $P_R$, that emulates a received power level, $P_R$, of a signal that would have been received by the receiver from an actual beacon located at the first location.

* * * * *